(12) United States Patent
Kusashima et al.

(10) Patent No.: US 11,425,640 B2
(45) Date of Patent: Aug. 23, 2022

(54) COMMUNICATION DEVICE, BASE STATION APPARATUS, METHOD, AND PROGRAM

(71) Applicant: Sony Corporation, Tokyo (JP)

(72) Inventors: Naoki Kusashima, Kanagawa (JP); Hiromasa Uchiyama, Tokyo (JP); Yifu Tang, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/968,166

(22) PCT Filed: Feb. 6, 2019

(86) PCT No.: PCT/JP2019/004175
§ 371 (c)(1),
(2) Date: Aug. 7, 2020

(87) PCT Pub. No.: WO2019/159777
PCT Pub. Date: Aug. 22, 2019

(65) Prior Publication Data
US 2021/0045051 A1    Feb. 11, 2021

(30) Foreign Application Priority Data

Feb. 15, 2018 (JP) ............................. JP2018-025286

(51) Int. Cl.
*H04W 48/10* (2009.01)
*H04W 48/20* (2009.01)
(Continued)

(52) U.S. Cl.
CPC ......... *H04W 48/20* (2013.01); *H04J 11/0079* (2013.01); *H04W 48/10* (2013.01); *H04W 64/006* (2013.01)

(58) Field of Classification Search
CPC .................................................... H04W 48/20
See application file for complete search history.

(56) References Cited

U.S. PATENT DOCUMENTS

| 10,127,822 | B2* | 11/2018 | Damnjanovic | G01S 5/0257 |
| 2010/0099433 | A1* | 4/2010 | Wigren | G01S 5/0257 |
| | | | | 455/456.1 |

(Continued)

FOREIGN PATENT DOCUMENTS

| EP | 2744268 A2 | 6/2014 |
| WO | 2010/125769 A1 | 11/2010 |

(Continued)

OTHER PUBLICATIONS

International Search Report and Written Opinion dated Mar. 19, 2019 for PCT/JP2019/004175 filed on Feb. 6, 2019, 9 pages including English Translation of the International Search Report.

(Continued)

*Primary Examiner* — Qutbuddin Ghulamali
(74) *Attorney, Agent, or Firm* — Xsensus LLP

(57) ABSTRACT

A communication device is provided that further improves the quality between radio links, in a communication system in which a base station apparatus communicates with a communication device.

A communication device is provided that includes a reception unit that receives system information including a set of identities indicating virtual cells, and a setting unit that selects a virtual cell identity to be applied, from the set.

14 Claims, 14 Drawing Sheets

(51) Int. Cl.
*H04J 11/00* (2006.01)
*H04W 64/00* (2009.01)

(56) References Cited

U.S. PATENT DOCUMENTS

| | | | |
|---|---|---|---|
| 2013/0235821 A1* | 9/2013 | Chen | H04W 48/20 370/328 |
| 2015/0373626 A1* | 12/2015 | Yi | H04B 1/7143 375/132 |
| 2016/0248533 A1* | 8/2016 | Li | H04J 11/0086 |
| 2018/0109991 A1* | 4/2018 | Whelan | H04W 24/08 |
| 2019/0319686 A1* | 10/2019 | Chen, IV | H04W 72/046 |

FOREIGN PATENT DOCUMENTS

| | | |
|---|---|---|
| WO | 2017/057987 A1 | 4/2017 |
| WO | 2017/076107 A1 | 5/2017 |

OTHER PUBLICATIONS

Ericsson, "New WID on Enhanced LTE Support for Aerial Vehicles," 3GPP TSG RAN Meeting No. 78, RP-172826, Lisbon, Portugal, Dec. 18-21, 2017, 4 pages.
Huawei and Hisilicon, "Potential DL enhancements for drones," 3GPP TSG RAN WG1 Meeting No. 90, R1-1716965, Prague, Czech Republic, Oct. 9-13, 2017, 9 pages.
Thales, et al., "Study on NR to support Non-Terrestrial Networks," 3GPP TSG RAN Meeting No. 75, RP-170717, Dubrovnik, Croatia, Mar. 6-9, 2017, 5 pages.
Samsung: "Remaining Issues on PDCCH Structure" 3GPP Draft; RI-1720319 Remaining Issues on PDCCH Structure, 3rd Generationpartnership Project (3GPP), Mobilecompetence Centre ; 650, Route Deslucioles ; F-06921 Sophia-Antipolis Cedex; Francevol. RAN WG1, No. Reno, USA; Nov. 27, 2017-Dec. 1, 2017 Nov. 18, 2017 (Nov. 18, 2017),XP051369909,Retrieved from the Internet: URL:http://www.3gpp.org/ftp/tsg%5Fran/WGI%5FRLI/TSGRI%5F91/Docs/[retrieved on Nov. 18, 2017] Section 3. Virtual drone cell.

* cited by examiner

COMMUNICATION DEVICE, BASE STATION APPARATUS, METHOD, AND PROGRAM

CROSS-REFERENCE TO RELATED APPLICATIONS

The present application is based on PCT filing PCT/JP2019/004175, filed Feb. 6, 2019, which claims priority to JP 2018-025286, filed Feb. 15, 2018, the entire contents of each are incorporated herein by reference.

FIELD

The present disclosure relates to a communication device, a base station apparatus, a method, and a program.

BACKGROUND

Radio access methods and radio networks for cellular mobile communications (hereinafter also referred to as "long term evolution (LTE)", "LTE-advanced (LTE-A)", "LTE-advanced pro (LTE-A Pro)", "new radio (NR)", "new radio access technology (NRAT)", "evolved universal terrestrial radio access (EUTRA)", and "further EUTRA (FEUTRA)") are discussed within the 3rd generation partnership project (3GPP). Note that in the following description, LTE includes LTE-A, LTE-A Pro, and EUTRA, and NR includes NRAT and FEUTRA. In LTE, a base station apparatus (base station) is also referred to as evolved NodeB (eNodeB), in NR, a base station apparatus (base station) is also referred to as a gNodeB, and in LTE and NR, a terminal device (mobile station, mobile station device, terminal) is also referred to as user equipment (UE). LTE and NR are a cellular communication system in which a plurality of areas covered by base station apparatuses is arranged into cells. A single base station apparatus may manage a plurality of cells.

LTE and NR have started to consider cellular communication for aerial vehicles, such as a drone and the like, to provide services to aerial vehicle from cellular networks on the ground. A propagation environment in the sky is different from a propagation environment on the ground, and it is known that there are problems with inter-cell interference and mobility in communication for aerial vehicle. Details of cellular communication for aerial vehicle in LTE and NR are disclosed in Non Patent Literature 1 and Non Patent Literature 2.

CITATION LIST

Non Patent Literature

Non Patent Literature 1: RP-172826, "New WID on Enhanced LTE Support for Aerial Vehicles", 3GPP TSG RAN Meeting #78, Lisbon, Portugal, Dec. 18-21, 2017.
Non Patent Literature 2: RP-170717, "Study on NR to support Non-Terrestrial Networks", 3GPP TSG RAN Meeting #75, Dubrovnik, Croatia, Mar. 6-9, 2017.

SUMMARY

Technical Problem

A communication device floating in the air receives interferences from a large number of surrounding cells, and it is difficult to receive a stable signal. Furthermore, duplication of a cell identity in surrounding cells makes it difficult to provide a stable cell connection.

Therefore, the present disclosure proposes a new and improved communication device, base station apparatus, method, and program that further improves the quality between radio links, in a communication system in which the base station apparatus communicates with the communication device.

Solution to Problem

According to the disclosure, a communication device is provided that includes: a reception unit that receives system information including a set of identities indicating virtual cells; and a setting unit that selects a virtual cell identity to be applied, from the set.

Moreover, according to the disclosure, a base station apparatus is provided that includes: a setting unit that sets a plurality of identities indicating virtual cells; and a transmission unit that transmits system information including a set of the virtual cell identities.

Moreover, according to the disclosure, a method performed by a processor, the method is provided that includes: receiving system information including a set of identities indicating virtual cells; and selecting a virtual cell identity to be applied, from the set.

Moreover, according to the disclosure, a computer program is provided that causes a computer to perform: receiving system information including a set of identities indicating virtual cells; and selecting a virtual cell identity to be applied, from the set.

Advantageous Effects of Invention

As described above, according to the present disclosure, it is possible to provide a novel and improved communication device, base station apparatus, method, and program that make it possible to further improve the quality between radio links in a communication system in which the base station apparatus and the communication device communicate with each other.

Note that the effects described above are not necessarily limitative, and with or in place of the above effects, there may be achieved any one of the effects described in this description or other effects that may be grasped from this description.

DESCRIPTION OF EMBODIMENTS

Figure 1:
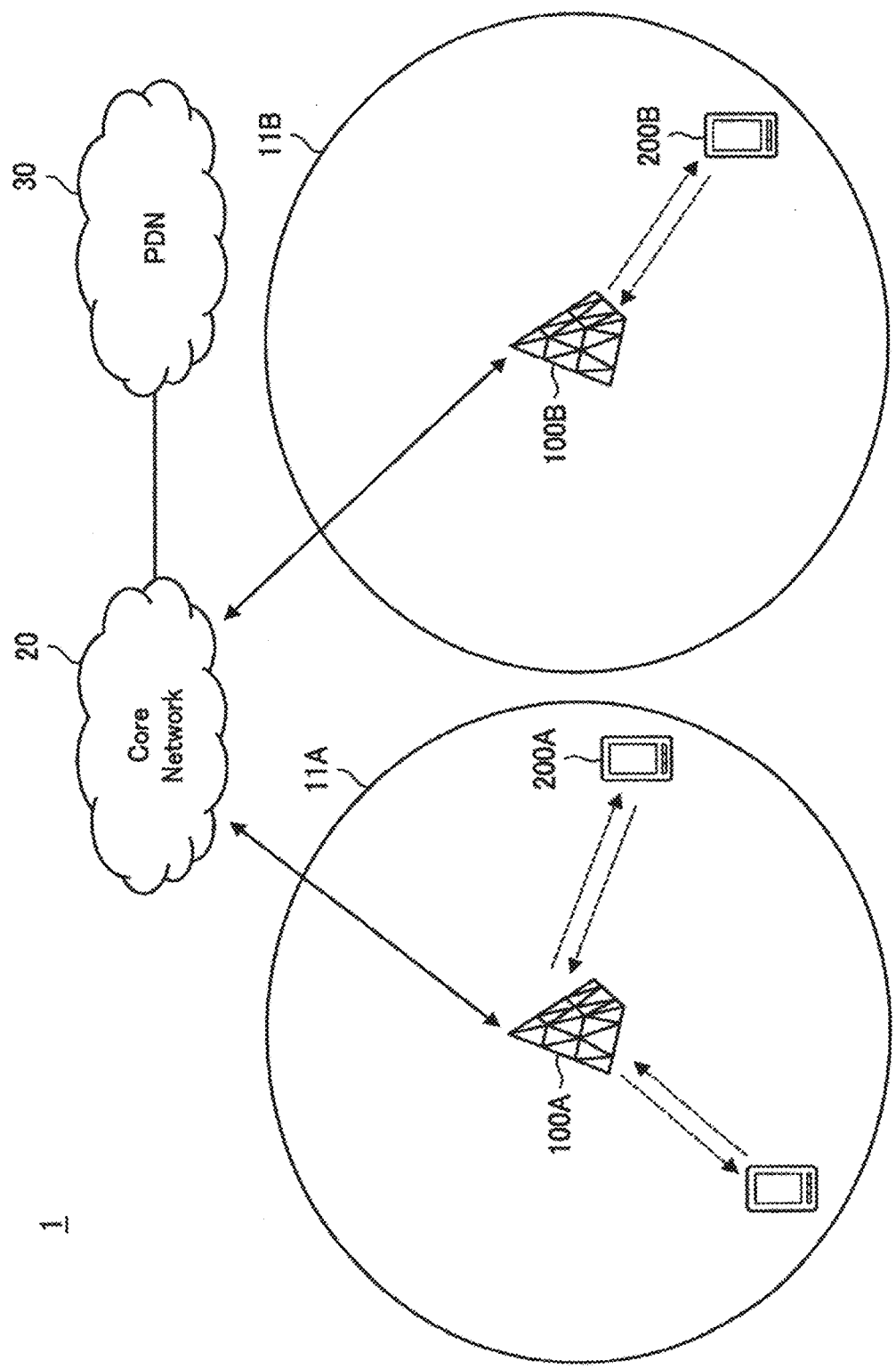
FIG. 1 is a diagram illustrating an example of an overall configuration of a system according to an embodiment of the present disclosure.

Hereinafter, preferred embodiments of the present disclosure will be described in detail with reference to the accompanying drawings. Note that, in this description and the drawings, component elements having substantially the same functional configurations are denoted by the same reference numerals and repeated description thereof is omitted. Furthermore, unless otherwise specified, the techniques, functions, methods, configurations, procedures, and all other descriptions made below are applicable to LTE and NR.

Note that the descriptions will be made in the following order.

1. Introduction
2. Configuration examples
3. Drone
4. Technical features
5. Application examples
6. Conclusion 1. Introduction <1.1. System Configuration Examples>

A base station apparatus 100 operates a cell 11 (11A or 11B) and provides radio service to one or more terminal devices located inside the cell 11. For example, a base station apparatus 100A provides radio service to a terminal device 200A, and a base station apparatus 100B provides radio service to a terminal device 200B. The cell 11 can be operated according to any radio communication system such as LTE or New Radio (NR). The base station apparatus 100 is connected to a core network 20. The core network 20 is connected to a PDN 30.

The core network 20 can include a mobility management entity (MME), serving gateway (S-GW), PDN gateway (P-GW), policy and charging rule function (PCRF), and home subscriber server (HSS). Alternatively, the core network 20 can include an entity of NR having functions similar to those described above. The MME is a control node that handles a control plane signal and manages a moving state of a terminal device. The S-GW is a control node that handles a user plane signal and includes a gateway device that switches user data transfer paths. The P-GW is a control node that handles a user plane signal and is includes gateway device that serves as a connection point between the core network 20 and the PDN 30. The PCRF is a control node that performs control about policy and charging, such as quality of service (QoS), for a bearer. The HSS is a control node that handles subscriber data and performs service control.

The terminal device 200 performs radio communication with the base station apparatus 100 on the basis of control by the base station apparatus 100. The terminal device 200 may employ a so-called user terminal (user equipment: UE). For example, the terminal device 200 transmits an uplink signal to the base station apparatus 100 and receives a downlink signal from the base station apparatus 100.

Figure 2:
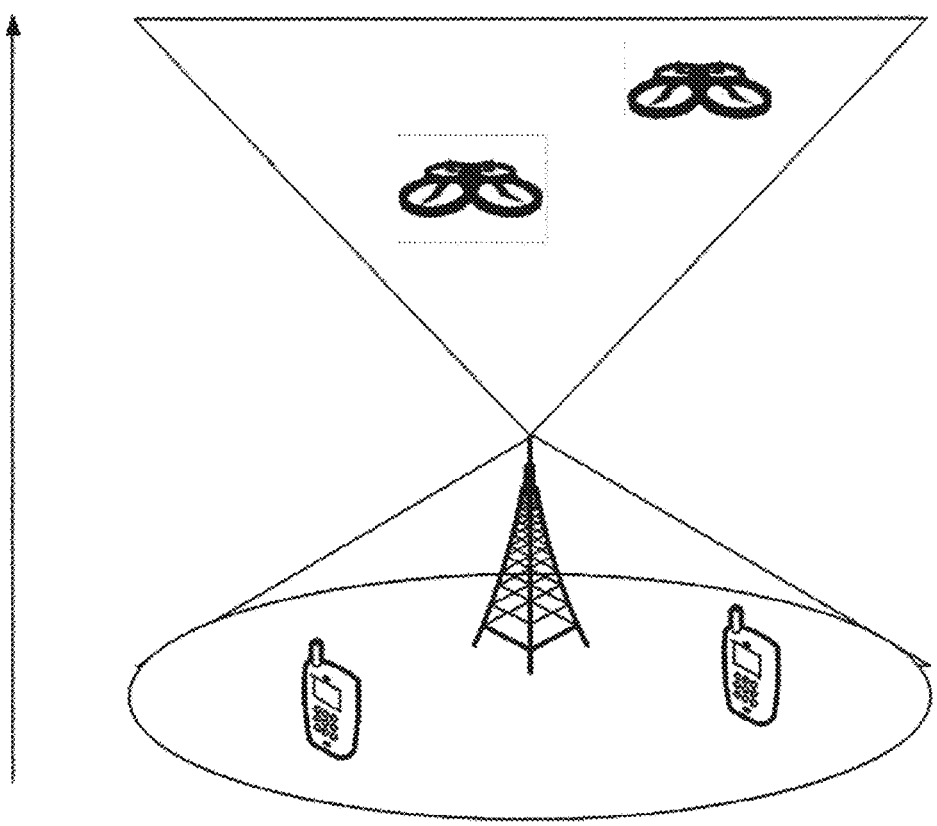
FIG. 2 is a diagram illustrating an example of a cellular network according to the present embodiment that supports aerial vehicle.

As illustrated in FIG. 2, a system according to the present embodiment makes it possible to provide a cellular network also to a terminal device floating in the air (hereinafter, referred to as an aerial vehicle terminal device) in addition to a normal terminal device on the ground. The aerial vehicle terminal device includes a drone, balloon, airplane, and the like. The base station apparatus enables coverage above ground and further enables coverage in the air by emitting radio waves in the sky.

<1.2. Technical Problems>

Radio waves that are emitted radially provide narrow coverage near the base station apparatus and provide wide coverage far from the base station apparatus. In communication at a high altitude far from the base station apparatus, the aerial vehicle terminal device floating in the air receives signals from a plurality of surrounding cells, and the aerial vehicle terminal device may have poor reception quality due to inter-cell interference. Specifically, for example, a resource, which is used to transmit a synchronization signal and reference signal (particularly, CRS) used for cell identification, is commonly used between cells, generating strong inter-cell interference. This inter-cell interference may cause significant deterioration in reception quality of a signal from a connection cell (serving cell).

Furthermore, in the present embodiment, exhaustion of physical cell identifications may lead to allocation of an identical physical cell identification to a current cell and surrounding cells. In this case, the aerial vehicle terminal device recognizes a signal received from a surrounding cell different from the current cell as a signal received from the current cell, making it difficult to perform normal cell connection. This phenomenon is also called cell confusion. The cell confusion occurring in the aerial vehicle terminal device causes problems, such as erroneous recognition of transmission/reception point or erroneous measurement of cell quality. While it is possible to take measures to avoid the duplication of physical cell identification by cell design, the complexity of cell design increases.

Figure 3:
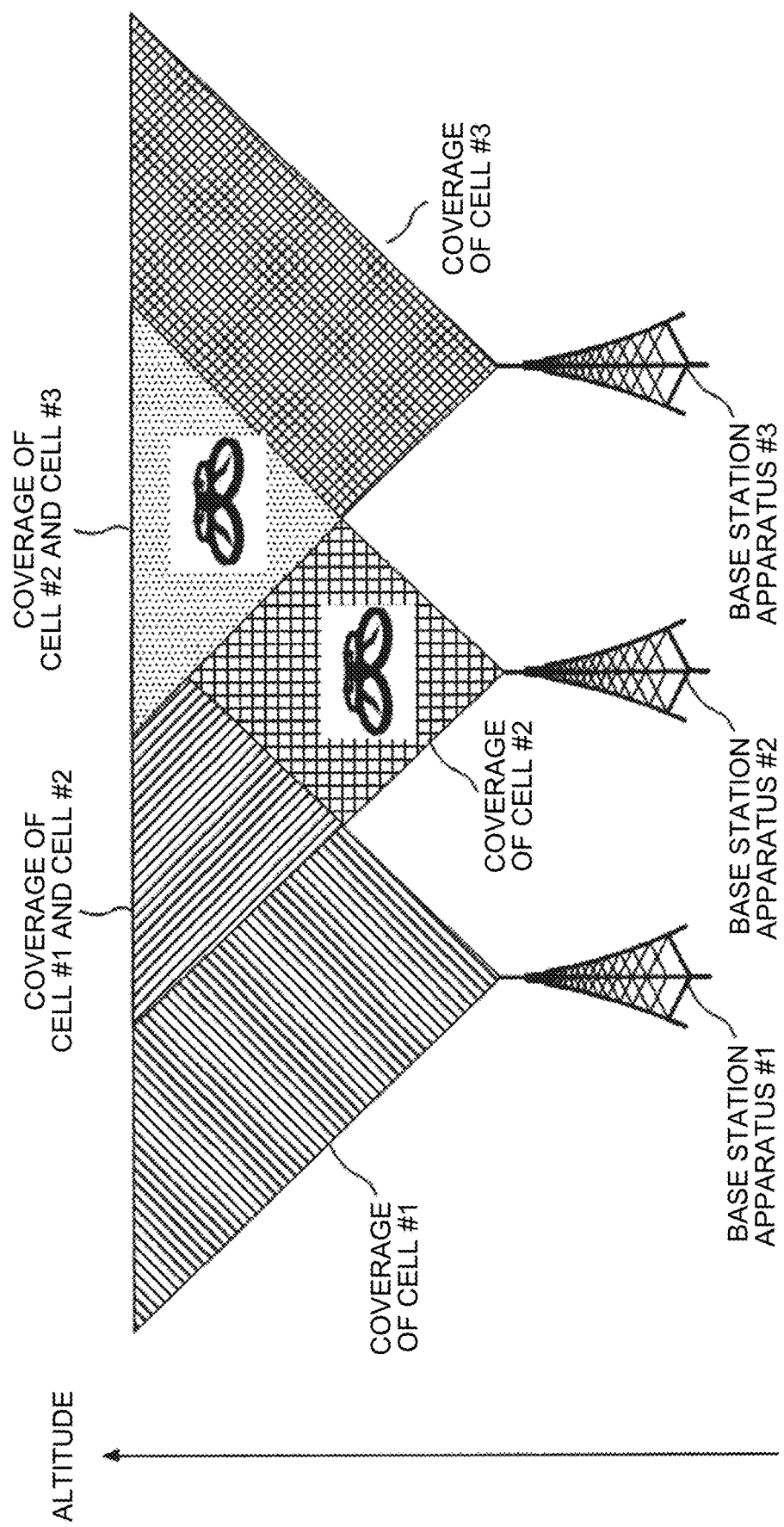
FIG. 3 is a diagram illustrating an example of a cellular network according to the present embodiment that supports aerial vehicle.

Hereinafter, a specific example will be described with reference to FIG. 3. An aerial vehicle terminal device #1 floating at a low altitude near a base station apparatus is within a coverage range of only a cell #2, and inter-cell interference has less influence. On the other hand, an aerial vehicle terminal device #2 floating at a high altitude far from the base station apparatus is within a coverage range of the cell #2 and a cell #3, receiving strong signals from the base station apparatus #2 and a base station apparatus #3. Therefore, the aerial vehicle terminal device #2 is significantly influenced by the inter-cell interference. Furthermore, when the base station apparatus #2 and the base station apparatus #3 use the same physical cell identification, the aerial vehicle terminal device #2 wrongly recognizes a signal received from the base station apparatus #2 and a signal received from the base station apparatus #3 as signals received from the same cell, leading to unstable cell connection.

<1.3. Overview of Proposed Method>

In view of the above technical problems, the present disclosure proposes a mechanism that enables to reduce inter-cell interference and cell confusion caused by duplication of cell identity in surrounding cells.

In the present embodiment, an imaginary cell (virtual cell) for the air is set that is different from a physical cell. An identity (virtual cell identify, VCI) used for identifying a virtual cell enables a terminal device to recognize the virtual cell. A base station apparatus uses broadcast information to report a set (table) of virtual cell identities, to a terminal device. For the terminal device, a virtual cell to which the terminal device is connected is switched to another virtual cell depending on a set of virtual cell identities and an environment of the terminal device. Setting of a virtual cell reduces inter-cell interference and cell confusion in a coverage area in the air, improving communication quality and connection stability.

<1.4. Related Technologies>

Hereinafter, technologies relating to the proposed method will be described.

<1.4.1. Frame Configuration>

In each of LTE cells, one predetermined parameter is used in a predetermined time length (e.g., subframe), that is, in an LTE cell, a downlink signal and an uplink signal are each generated in a predetermined time length by using the one predetermined parameter. In other words, it is assumed that in a terminal device 200, a downlink signal transmitted from a base station apparatus 100 and an uplink signal transmitted to the base station apparatus 100 are each generated by using the one predetermined parameter, in the predetermined time length. Furthermore, the base station apparatus 100 can be configured so that the downlink signal transmitted to the terminal device 200 and the uplink signal transmitted from the terminal device 200 are each generated by using the one predetermined parameter, in the predetermined time length. The one predetermined parameter is, for example, a subcarrier spacing of 15 kHz.

In each of NR cells, one or more predetermined parameters are used for a predetermined time length (e.g., slot). In other words, in an NR cell, a downlink signal and an uplink signal are generated in a predetermined time length by using the one or more predetermined parameters. In other words, it is assumed that in a terminal device 200, a downlink signal transmitted from a base station apparatus 100 and an uplink signal transmitted to the base station apparatus 100 are each generated by using the one or more predetermined parameters, in the predetermined time length. Furthermore, the base station apparatus 100 can be configured so that the downlink signal transmitted to the terminal device 200 and the uplink signal transmitted from the terminal device 200 are each generated by using the one or more predetermined parameters, in the predetermined time length. When a plurality of predetermined parameters is used, signals generated by using the predetermined parameters are multiplexed by a predetermined method. For example, the predetermined method includes frequency division multiplexing (FDM), time division multiplexing (TDM), code division multiplexing (CDM), and/or spatial division multiplexing (SDM).

Figure 4:
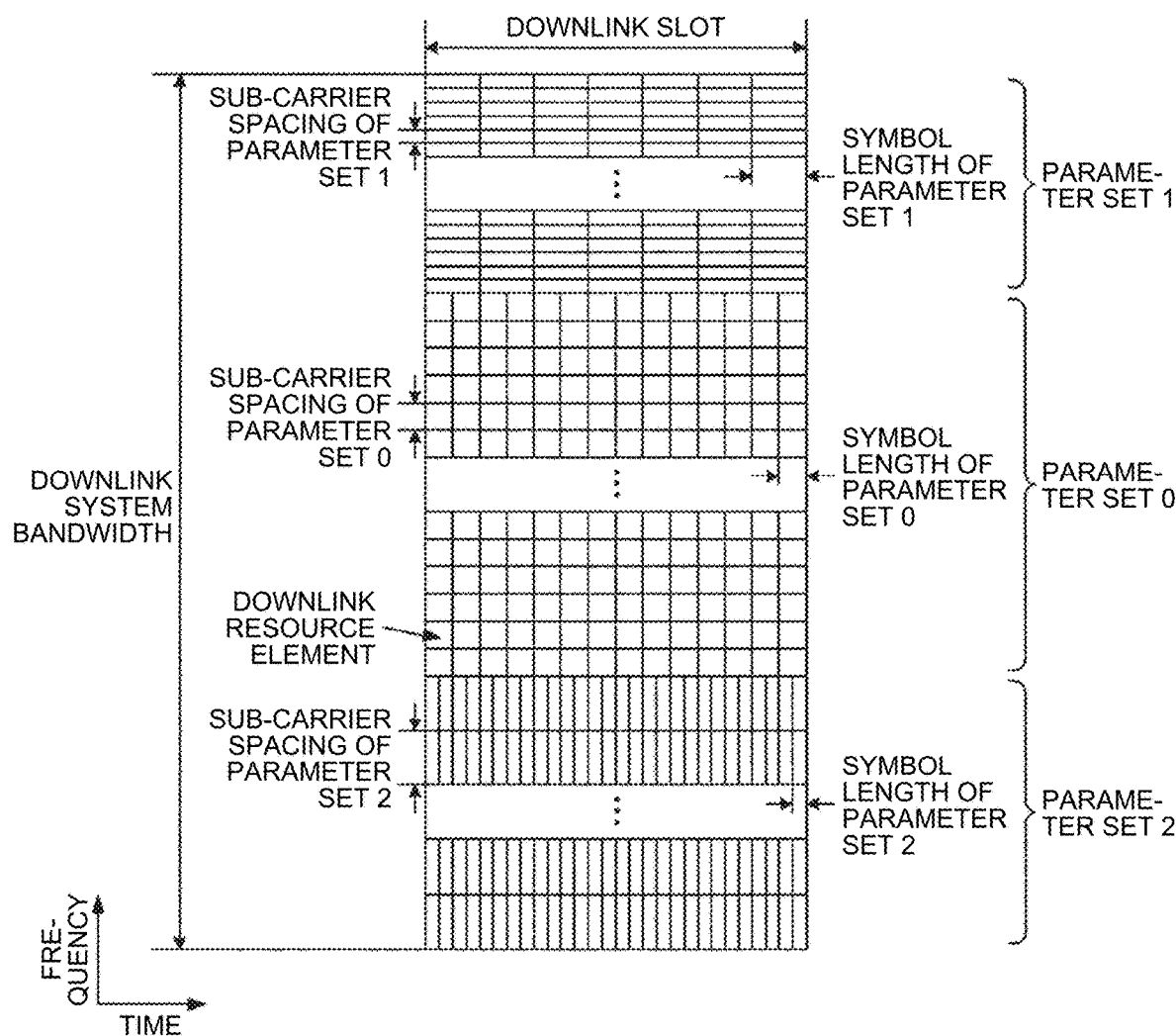
FIG. 4 is a diagram illustrating an example of a downlink slot according to the present embodiment.

FIG. 4 is a diagram illustrating an example of a downlink slot according to the present embodiment. In the example of FIG. 4, in NR, signals generated by using a parameter set 1, a parameter set 0, and a parameter set 2 are multiplexed using FDM and transmitted and received in a cell (system bandwidth). Furthermore, in the example of FIG. 4, in LTE, a signal generated by using any one of the parameter set 1, the parameter set 0, or the parameter set 2 is transmitted and received in a cell (system bandwidth). The diagram illustrated in FIG. 4 is also referred to as downlink resource grid. A base station apparatus 100 is configured to transmit a downlink physical channel and/or a downlink physical signal, in a downlink slot to a terminal device 200. The terminal device 200 is configured to receive a downlink physical channel and/or a downlink physical signal, in a downlink slot from the base station apparatus 100.

Figure 5:
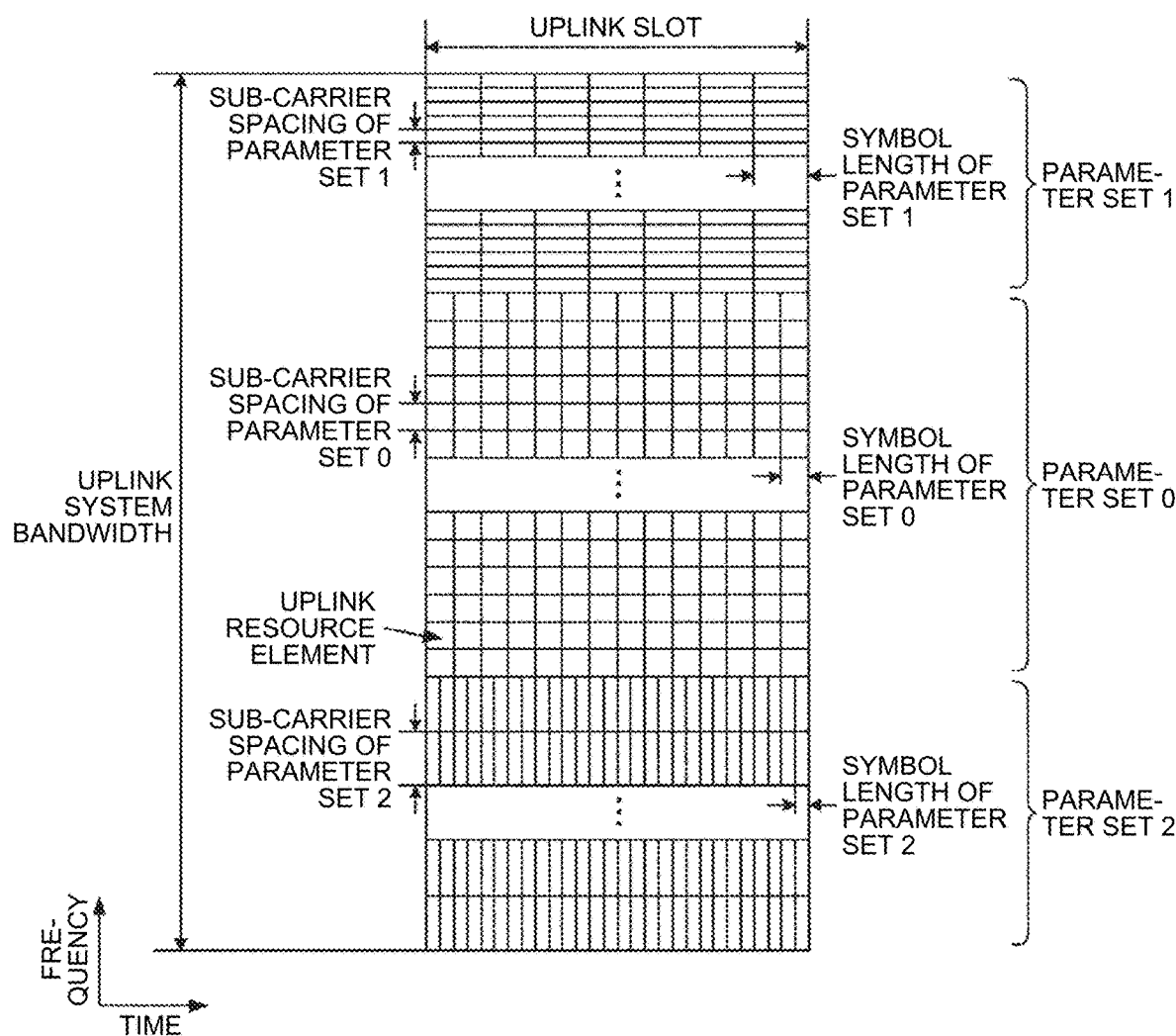
FIG. 5 is a diagram illustrating an example of an uplink slot according to the present embodiment.

FIG. 5 is a diagram illustrating an example of an uplink slot according to the present embodiment. In the example of FIG. 5, in NR, signals generated by using a parameter set 1, a parameter set 0, and a parameter set 2 are multiplexed using FDM and transmitted and received in a cell (system bandwidth). Furthermore, in the example of FIG. 5, in LTE, a signal generated by using any one of the parameter set 1, the parameter set 0, or the parameter set 2 is transmitted and received in a cell (system bandwidth). The diagram illustrated in FIG. 5 is also referred to as uplink resource grid. A base station apparatus 100 is configured to transmit an uplink physical channel and/or an uplink physical signal, in an uplink slot to a terminal device 200. The terminal device 200 is configured to receive an uplink physical channel and/or an uplink physical signal, in an uplink slot from the base station apparatus 100.

In the present embodiment, a physical resources can be defined as follows. One slot is defined by a plurality of symbols. A physical signal or physical channel transmitted in each of the slots is expressed in a resource grid. The resource grid is defined by a plurality of subcarriers in the frequency direction and a plurality of symbols (OFDM symbols or SC-FDMA symbols) in the time direction. The number of subcarriers or resource blocks may be determined depending on the bandwidth of a cell. The number of symbols in a slot is determined by the type of a cyclic prefix (CP). The type of CP is a normal CP or an extended CP. In the normal CP, one slot includes seven OFDM symbols or SC-FDMA symbols. In the extended CP, one slot includes six OFDM symbols or SC-FDMA symbols. Each of elements in the resource grid is called a resource element. A resource element is identified using an index (the number) of a subcarrier and an index (the number) of a symbol. Note that in the description of the present embodiment, the OFDM symbol or SC-FDMA symbol is also simply referred to as a symbol.

The resource blocks are used to map a certain physical channel (such as PDSCH or PUSCH) to the resource elements. The resource blocks include a virtual resource block and a physical resource block. A physical channel is mapped to a virtual resource block. The virtual resource block is mapped to a physical resource block. One physical resource block is defined by a predetermined number of continuous symbols in a time domain. One physical resource block is defined by a predetermined number of continuous subcarriers in a frequency domain. The number of symbols and the number of subcarriers in one physical resource block are determined on the basis of the type of CP in a cell, subcarrier spacing and/or a parameter set depending on an upper layer, and the like. For example, when the type of CP is a normal CP and the subcarrier spacing is 15 kHz, one physical resource block includes seven symbols and 12 subcarriers. In that case, one physical resource block includes (7×12) resource elements. The physical resource blocks are numbered from 0 in the frequency domain. Furthermore, two resource blocks in one subframe to which the same physical resource block number corresponds are defined as a physical resource block pair (PRB pair, RB pair).

<1.4.2. Physical Signal and Physical Channel>

A synchronization signal (SS) is used for at least synchronization between the frequency domain and/or the time domain of downlink by a terminal device 200. The synchronization signals include a primary synchronization signal (PSS) and a secondary synchronization signal (SSS). In LTE, a synchronization signal is arranged in a predetermined subframe in a radio frame. For example, in a TDD system, the synchronization signals are arranged in subframes 0, 1, 5, and 6 in a radio frame. In an FDD system, the synchronization signals are arranged in subframes 0 and 5 in a radio frame. In NR, the synchronization signals are included in a synchronization signal block (SS block).

PSS may be used for rough frame/symbol timing synchronization (time-domain synchronization) or cell identity group identification. SSS may be used for more accurate frame timing synchronization, cell identification, or CP length detection. In other words, use of the PSS and the SSS enables frame timing synchronization and cell identification.

A physical broadcast channel (PBCH) is used to notify of a master information block (MIB) that is notification information unique to a serving cell of a base station apparatus 100. MIB is system information. For example, MIB includes information necessary for receiving PDCCH and information indicating a radio frame number (system frame number, SFN). In LTE, PBCH is arranged in a subframe 0. In NR, PBCH is included in a synchronization signal block.

In NR, the synchronization signal block includes PSS, SSS, PBCH, and DMRS that is used for the PBCH. The PSS, SSS, PBCH, and DMRS that is used for the PBCH included in the synchronization signal block are arranged in a resource of 288 subcarriers and 4 symbols. A synchronization signal block is arranged in predetermined 4 symbols in a radio frame.

In a terminal device 200, a cell-specific reference signal (CRS) is used for FFT window timing synchronization (fine synchronization), frequency and time tracking, calculation of downlink channel state information, downlink RRM measurement, PDCCH/PDSCH demodulation. CRS is transmitted in all subframes in LTE. CRS is transmitted using antenna ports 0 to 3. CRS is transmitted using the first, fourth, seventh, and tenth symbols in a subframe. CRSs transmitted by a predetermined antenna port are arranged every six subcarriers and are cyclically shifted on the basis of a physical cell identification. In other words, CRS is transmitted by repeating six-cells on the frequency axis. Note that CRS is not transmitted in an NR cell.

In a terminal device 200, a channel state information reference signal (CSI-RS) is used for calculation of downlink channel state information and downlink RRM measurement. Note that CSI-RS may be used for frequency and time tracking. CSI-RS is transmitted in a set subframe. Resources by which CSI-RS is transmitted is set by a base station apparatus 100. A terminal device 200 performs signal measurement (channel measurement) by using the CSI-RS. CSI-RS supports configuration of some or all of antenna ports 1, 2, 4, 8, 12, 16, 24, and 32. Note that antenna ports supported may be determined on the basis of the terminal device 200 capability of the terminal device 200, setting of an RRC parameter, and/or a transmission mode that is to be set.

Zero power CSI-RS (ZP CSI-RS) resource is set by an upper layer. The ZP-CSI-RS resource may be transmitted with zero output power. In other words, ZP-CSI-RS resource needs no transmission. PDSCH and PDCCH are not transmitted in a resource to which ZP CSI-RS is set. For example, the ZP-CSI-RS resource is used for transmission of NZP CSI-RS in a neighboring cell. Furthermore, for example, the ZP-CSI-RS resource is used for measurement, CSI-IM. Furthermore, for example, the ZP-CSI-RS resource is a resource in which a predetermined channel such as PDSCH is not transmitted. In other words, the predetermined channel is mapped (rate matching and puncturing) except for the ZP-CSI-RS resource.

A physical downlink control channel (PDCCH) is used to transmit downlink control information (DCI). Mapping of an information bit of the downlink control information is defined as a DCI format. The downlink control information includes a downlink grant and an uplink grant. The downlink grant is also referred to as downlink assignment or downlink allocation. PDCCH is transmitted by one or more aggregations of continuous control channel elements (CCEs). In LTE, a CCE includes nine resource element groups (REGs). In NR, CCE includes six REGs. In LTE, an REG includes four resource elements. In NR, an REG includes one resource block and one OFDM symbol. When a PDCCH includes n continuous CCEs, the PDCCH starts from a CCE that satisfies a condition that the remainder obtained by dividing i, which is an index (number) of the CCE, by n is 0.

A PDCCH region is a resource in which PDCCH can be arranged. In an LTE cell, a PDCCH region is set over an entire system band. In an NR cell, a PDCCH region is set to a predetermined number of symbols and resource blocks. In an NR cell, the PDCCH region is also referred to as control resource set (CORESET).

In an LTE cell, an enhanced physical downlink control channel (EPDCCH) can be used to transmit downlink control information (DCI). The EPDCCH is transmitted by one or more aggregations of continuous enhanced control channel elements (ECCEs). ECCE includes a plurality of enhanced resource element groups (EREGs).

An EPDCCH region is a resource in which EPDCCH can be arranged. In an LTE cell, an EPDCCH region is set in a predetermined number of resource blocks. The EPDCCH region is also referred to as EPDCCH set.

A physical downlink shared channel (PDSCH) is used to transmit downlink data (downlink shared channel: DL-SCH). Furthermore, the PDSCH is also used to transmit control information for an upper layer.

A demodulation reference signal (DMRS) relating to PDSCH is transmitted in a subframe and band used to transmit the PDSCH to which the DMRS relates. DMRS is used to demodulate PDSCH to which the DMRS relates.

In an LTE cell, DMRS relating to EPDCCH is transmitted in a slot and resource block used to transmit the EPDCCH to which the DMRS relates. DMRS is used to demodulate EPDCCH to which the DMRS relates.

In an NR cell, DMRS relating to PDCCH is transmitted in a slot and resource block used to transmit the PDCCH to which the DMRS relates. DMRS is used to demodulate PDCCH to which the DMRS relates.

A discovery reference signal or discovery signal (DRS) is used, in a terminal device 200, for cell detection and downlink RRM measurement. Note that DRS may be used for calculating downlink channel state information or tracking downlink. DRS includes one PSS, SSS, and CRS. Furthermore, DRS may include CSI-RS. In NR, the DRS may include DMRS for PBCH.

A physical uplink control channel (PUCCH) is a physical channel used to transmit uplink control information (UCI). The uplink control information includes downlink channel state information (CSI), a scheduling request (SR) indicating a PUSCH resource request, and HARQ-ACK for downlink data (transport block: TB, downlink-shared channel: DL-SCH). HARQ-ACK is also referred to as ACK/NACK, HARQ feedback, or response information. Furthermore, HARQ-ACK for downlink data indicates ACK, NACK, or DTX.

A physical uplink shared channel (PUSCH) is a physical channel used to transmit uplink data (uplink-shared channel: UL-SCH). Furthermore, PUSCH may be used to transmit HARQ-ACK and/or channel state information together with uplink data. Furthermore, PUSCH may be used to transmit only channel state information or only HARQ-ACK and channel state information.

A physical random access channel (PRACH) is a physical channel used to transmit a random access preamble. The random access preamble is also called a PRACH preamble. PRACH can be used for synchronization between a terminal device 200 and a base station apparatus 100 in the time domain. Furthermore, PRACH is also used for an initial connection establishment procedure (processing), handover procedure, connection re-establishment procedure, synchronization for uplink transmission (timing adjustment), and/or PUSCH resource request.

An uplink demodulation reference signal (UL-DMRS) relates to transmission of PUSCH or PUCCH. UL-DMRS is multiplexed with PUSCH or PUCCH by using time division multiplexing. A base station apparatus 100 may use UL-DMRS to perform channel correction for PUSCH or PUCCH. In the description of the present embodiment, the transmission of PUSCH also includes transmission of PUSCH multiplexed with UL-DMRS. In the description of the present embodiment, the transmission of PUCCH includes transmission of PUCCH multiplexed with UL-DMRS.

A base station apparatus 100 may use a sounding reference signal (SRS) to measure an uplink channel state. In LTE, SRS is transmitted using the last symbol or the second symbol from the last in an uplink subframe or special subframe. In NR, SRS is transmitted using the last four symbols in a slot.

<1.4.3. Initial Access>

Initial connection (initial access) is a process of transition from a state in which a terminal device 200 is not connected to any cell (idle state) to a state in which the terminal device 200 has established a connection with a cell (connection state).

Figure 6:
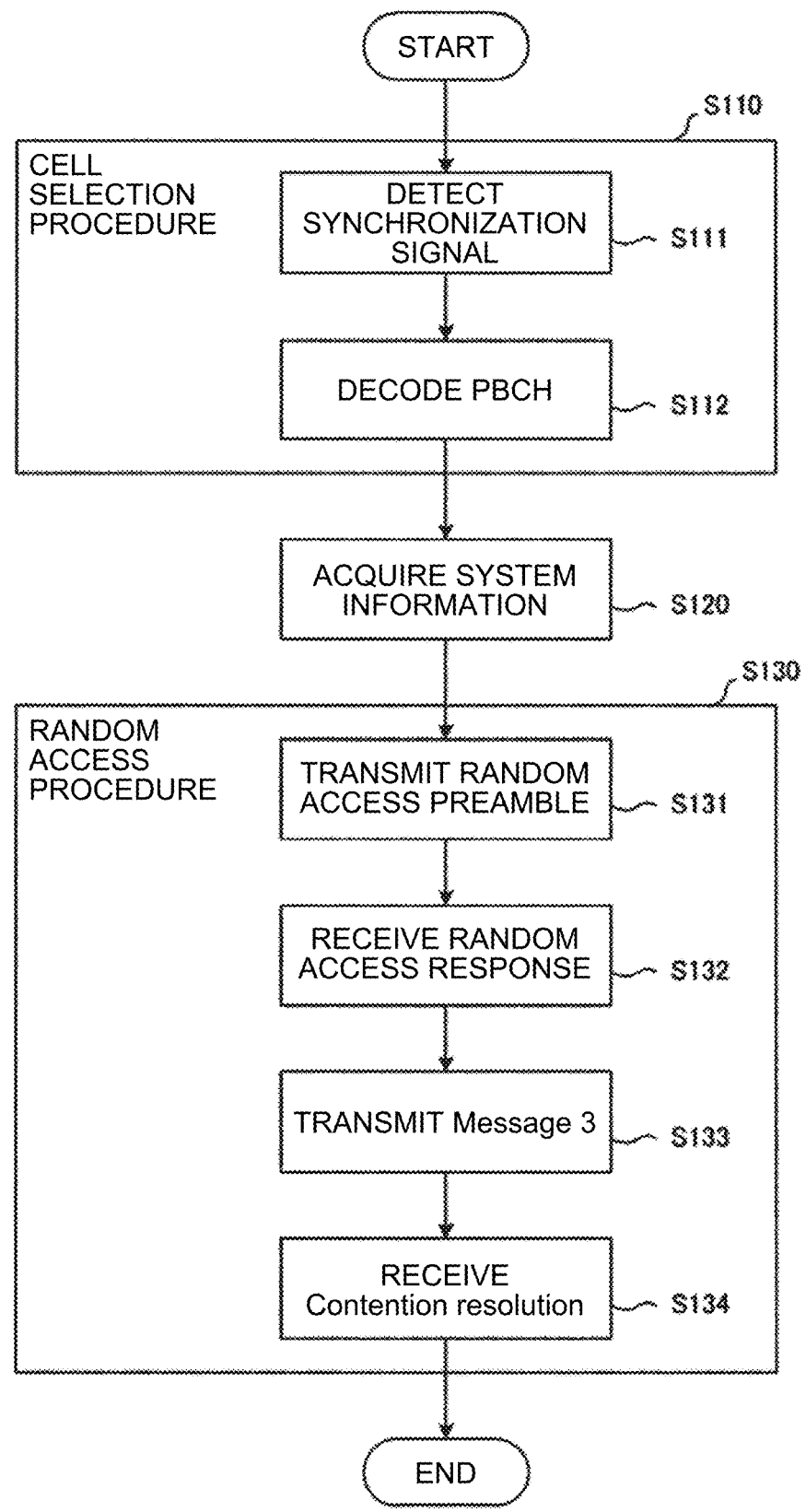
FIG. 6 is a flowchart illustrating an example of an initial connection procedure of a terminal device 200 according to the present embodiment.

FIG. 6 is a flowchart illustrating an example of an initial connection procedure of a terminal device 200 according to the present embodiment. As illustrated in FIG. 6, the terminal device 200 in the idle state performs a cell selection procedure (step S110). The cell selection procedure includes the steps of detecting a synchronization signal (step S111) and decoding PBCH (step S112). The terminal device 200 performs synchronization with a cell on downlink on the basis of detection of a synchronization signal. Then, after the downlink synchronization is established, the terminal device 200 decodes PBCH to acquire first system information.

Next, the terminal device 200 acquires second system information on the basis of the first system information included in the PBCH (step S120).

Then, the terminal device 200 performs a random access procedure (RACH procedure) on the basis of the first system information and/or the second system information (Step S130). The random access procedure includes the steps of transmitting a random access preamble (step S131), receiving a random access response (step S132), transmitting a message 3 (step S133), and receiving contention resolution (step S134). The terminal device 200 first selects and transmits predetermined PRACH preamble. Next, the terminal device 200 receives PDSCH including a random access response corresponding to the transmitted PRACH preamble. Next, the terminal device 200 uses a resource scheduled by random access response grant included in the received random access response, transmitting PUSCH including message 3. Finally, the terminal device 200 receives PDSCH including contention resolution corresponding to the PUSCH.

Message 3 includes an RRC message on an RRC connection request. Contention resolution includes an RRC message on RRC connection setup. When receiving an RRC message on RRC connection setup, the terminal device 200 performs RRC connection operation and transitions from an RRC idle state to an RRC connection state. After transition to the RRC connection state, the terminal device 200 transmits an RRC message on completion of RRC connection setup to a base station apparatus 100. Through these series of operations, the terminal device 200 can be connected to the base station apparatus 100.

Note that the random access preamble is also referred to as message 1, the random access response is referred to as message 2, the contention resolution is referred to as message 4, and the RRC connection setup completion message is referred to as message 5.

After all the steps of the random access procedure are completed, the terminal device 200 can transition to a state in which the terminal device 200 is connected to the cell (connection state).

Note that the random access procedure illustrated in FIG. 6 is also referred to as 4-step RACH procedure. On the other hand, a random access procedure in which a terminal device 200 transmits message 3 as well as the transmission of a random access preamble and, in response thereto, a base station apparatus 100 transmits a random access response and contention resolution is referred to as a two-step RACH procedure.

A random access preamble is transmitted in association with PRACH. A random access response is transmitted on PDSCH. PDSCH including a random access response is scheduled using PDCCH. Message 3 is transmitted on PUSCH. PUSCH including message 3 is scheduled by an uplink grant included in a random access response.

<1.4.4. RRM Measurement and Report>

Radio resource management (RRM) measurement is performed in a base station apparatus 100 and a terminal device 200. RRM measurement information is used to determine cell selection, cell reselection, handover, radio resource control, and the like.

In RRM measurement, signal strength and communication quality between the base station apparatus 100 and the terminal device 200 are measured. Specifically, reference signal received power (RSRP), reference signal received quality (RSRQ), received signal strength indicator (RSSI), signal to interference plus noise ratio (SINR) and the like are measured. RSRP is mainly used for determination in quality of communication from the base station apparatus 100, measurement of path loss, and the like. RSRQ and SINR are mainly used for determination in quality of communication with the base station apparatus 100 and the like. RSSI is mainly used for measurement of interference in the radio resource.

RSRP represents the power received from a predetermined reference signal. The predetermined reference signal is, for example, CRS, SSS, DMRS that relates to PBCH, CSI-RS that is transmitted by a predetermined antenna port, or the like. RSRP is defined, for example, as power received on a single resource element.

RSSI represents average power of a total received power measured for a predetermined period. RSSI includes all power received from serving and non-serving cells, adjacent channel interference, thermal noise, and the like. RSSI is defined as power received on one OFDM symbol.

RSRQ is defined as a ratio of RSRP to RSSI. Specifically, RSRQ is a value obtained by dividing RSRP by RSSI. Note that RSRQ may be defined as a value obtained by multiplying the above-described value by the number of resource blocks or resource elements for which RSSI is measured.

SINR is defined as a ratio of the power received from a predetermined base station apparatus 100 to the power received from a base station apparatus 100 other than the predetermined base station apparatus 100. SINR measured using a resource carrying a predetermined synchronization signal is called SS-SINR. SINR measured using a resource carrying a predetermined reference signal is called RS-SINR.

A measurement result of RRM measurement measured by the terminal device 200 can be reported to the base station apparatus 100. The measurement result of the RRM measurement can be reported when a predetermined condition is satisfied. For example, the predetermined condition includes a case in which a measurement result is larger than or smaller than a threshold value set by an upper layer, a case in which a measurement result is smaller than a threshold value set by an upper layer, a case in which a measurement of a target cell to be measured (e.g., a serving cell) is larger than or smaller than a measurement result of another cell (e.g., neighboring cell), or a case in which a predetermined time has passed since the previous report.

2. Configuration Examples

<2.1. Configuration Example of Base Station Apparatus 100 According to Present Embodiment>

Figure 7:
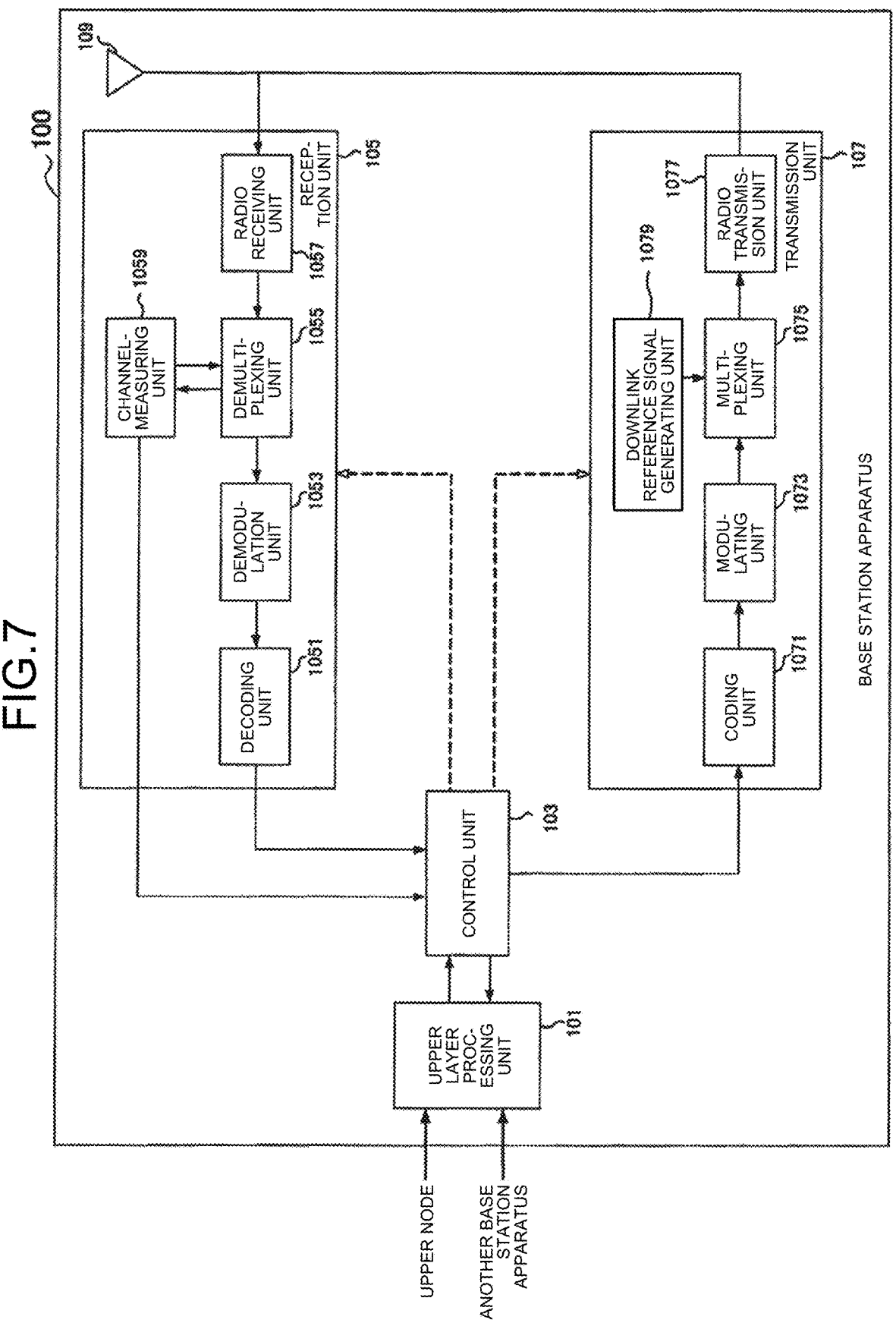
FIG. 7 is a schematic block diagram illustrating a configuration of a base station apparatus 100 according to the present embodiment.

FIG. 7 is a schematic block diagram illustrating a configuration of a base station apparatus 100 according to the present embodiment. As illustrated in the drawing, the base station apparatus 100 includes an upper layer processing unit 101, a control unit 103, a reception unit 105, a transmission unit 107, and a transmission/reception antenna 109. Furthermore, the reception unit 105 includes a decoding unit 1051, a demodulation unit 1053, a demultiplexing unit 1055, a radio receiving unit 1057, and a channel-measuring unit 1059. Furthermore, the transmission unit 107 includes a coding unit 1071, a modulating unit 1073, a multiplexing unit 1075, a radio transmission unit 1077, and a downlink reference signal generating unit 1079.

As described above, the base station apparatus 100 is configured to support one or more RATS. Some or all of the units included in the base station apparatus 100 illustrated in FIG. 7 can be individually configured according to the RATS. For example, the reception unit 105 and the transmission unit 107 can be individually configured for LTE and NR. Furthermore, in an NR cell, some or all of the units included in the base station apparatus 100 illustrated in FIG. 7 can be individually configured according to transmission signal parameter sets. For example, in a certain NR cell, the radio receiving unit 1057 and the radio transmission unit 1077 can be individually configured according to transmission signal parameter sets.

The upper layer processing unit 101 processes a medium access control (MAC) layer, a packet data convergence protocol (PDCP) layer, a radio link control (RLC) layer, a radio resource control (RRC) layer. Furthermore, the upper layer processing unit 101 generates control information to control the reception unit 105 and the transmission unit 107 and outputs the generated control information to the control unit 103.

The control unit 103 controls the reception unit 105 and the transmission unit 107 on the basis of the control information output from the upper layer processing unit 101. The control unit 103 generates control information for the upper layer processing unit 101 and outputs the control information to the upper layer processing unit 101. The control unit 103 receives an input of a decoded signal from the decoding unit 1051 and a channel estimation result from the channel-measuring unit 1059. The control unit 103 outputs a signal to be coded to a coding unit 1071. Furthermore, the control unit 103 is used to control all or part of the base station apparatus 100.

The upper layer processing unit 101 performs processing and management relating to RAT control, radio resource control, subframe setting, scheduling control, and/or CSI report control. The processing and management in the upper layer processing unit 101 are performed for each terminal device 200 or commonly to terminal devices 200 connected to the base station apparatus 100. The processing and management in the upper layer processing unit 101 may be performed only by the upper layer processing unit 101 or may be obtained from an upper node or another base station apparatus 100. Furthermore, the processing and management in the upper layer processing unit 101 may be performed individually according to RATS. For example, the upper layer processing unit 101 individually performs processing and management for LTE and processing and management for NR.

In the RAT control in the upper layer processing unit 101, RAT management is performed. For example, in RAT control, LTE management and/or NR management is performed. The NR management includes setting and processing of a transmission signal parameter set in an NR cell.

In the radio resource control in the upper layer processing unit 101, generation and/or management of downlink data (transport block), system information, an RRC message (RRC parameter), and/or a MAC control element (CE) is performed.

In the subframe setting in the upper layer processing unit 101, management of subframe setting, subframe pattern setting, uplink-downlink setting, uplink reference UL-DL setting, and/or downlink reference UL-DL setting is performed. Note that the subframe setting in the upper layer processing unit 101 is also referred to as base station subframe setting. The subframe setting in the upper layer processing unit 101 can be determined on the basis of an uplink traffic and a downlink traffic. Furthermore, the subframe setting in the upper layer processing unit 101 can be determined on the basis of a scheduling result of the scheduling control in the upper layer processing unit 101.

In the scheduling control in the upper layer processing unit 101, a frequency and subframe to which a physical channel is allocated, coding rate of a physical channel, modulation method, transmission power, and the like are determined, on the basis of a channel state information received, a channel estimation value and channel quality that are input from the channel-measuring unit 1059. For example, the control unit 103 generates control information (DCI format) on the basis of a scheduling result of scheduling control in the upper layer processing unit 101.

In the CSI report control in the upper layer processing unit 101, a CSI report on a terminal device 200 is controlled. For example, setting relating to a CSI reference resource for assumption to calculate CSI in the terminal device 200 is controlled.

The reception unit 105, according to control from the control unit 103, receives a signal transmitted from a terminal device 200 via the transmission/reception antenna 109, further performs reception processing, such as separation, demodulation, or decoding, and outputs information after the reception processing to the control unit 103. Note that the reception processing in the reception unit 105 is performed on the basis of setting previously determined or setting reported to the terminal device 200 by the base station apparatus 100.

The radio receiving unit 1057 converts (down-converts) an uplink signal received via the transmission/reception antenna 109 into an intermediate frequency, removes an unnecessary frequency component, controls an amplification level to suitably maintain a signal level, performs quadrature demodulation on the basis of an in-phase component and quadrature component of the received signal, converts an analog signal to a digital signal, removes a guard interval (GI), and/or extracts a frequency domain signal by fast Fourier transform (FFT).

The demultiplexing unit 1055 separates an uplink channel, such as PUCCH or PUSCH, and/or an uplink reference signal from a signal input from the radio receiving unit 1057. The demultiplexing unit 1055 outputs the uplink reference signal to the channel-measuring unit 1059. The demultiplexing unit 1055 compensates for a channel for an uplink channel on the basis of a channel estimation value input from the channel-measuring unit 1059.

The demodulation unit 1053 demodulates, for a modulated symbol on an uplink channel, a received signal by using a modulation method such as binary phase shift keying (BPSK), quadrature phase shift keying (QPSK), 16 quadrature amplitude modulation (QAM), 64QAM, or 256QAM. The demodulation unit 1053 separates and demodulates a MIMO-multiplexed uplink channel.

The decoding unit 1051 performs decoding processing on a demodulated coded bits on an uplink channel. Decoded uplink data and/or uplink control information is output to the control unit 103. The decoding unit 1051 performs decoding processing on PUSCH for each transport block.

The channel-measuring unit 1059 measures a channel estimation value, channel quality, and/or the like on the basis of an uplink reference signal input from the demultiplexing unit 1055 and outputs the measurement(s) to the demultiplexing unit 1055 and/or the control unit 103. For example, the channel-measuring unit 1059 measures a channel estimation value to perform channel compensation for PUCCH or PUSCH by using UL-DMRS and measures channel quality in uplink by using SRS.

The transmission unit 107 performs transmission processing such as coding, modulation, and multiplexing on downlink control information and downlink data input from the upper layer processing unit 101, according to control by the control unit 103. For example, the transmission unit 107 generates and multiplexes PHICH, PDCCH, EPDCCH, PDSCH, and a downlink reference signal to generate a transmission signal. Note that transmission process in the transmission unit 107 is performed on the basis of predetermined setting, a setting reported from the base station apparatus 100 to the terminal device 200, or setting reported via PDCCH or EPDCCH transmitted in the same subframe.

The coding unit 1071 encodes a HARQ indicator (HARQ-ACK), downlink control information, and downlink data input from the control unit 103 by using predetermined coding method, such as block coding, convolutional coding, or turbo coding. The modulating unit 1073 modulates coded bits input from the coding unit 1071 by using a predetermined modulation method such as BPSK, QPSK, 16QAM, 64QAM, or 256QAM. The downlink reference signal generating unit 1079 generates a downlink reference signal on the basis of a physical cell identification (PCI), an RRC parameter that is set in the terminal device 200, and the like. The multiplexing unit 1075 multiplexes a modulated symbol and downlink reference signal on each channel and arranges the multiplexed modulated symbol and downlink reference signal in a predetermined resource element.

The radio transmission unit 1077 performs processing on a signal from the multiplexing unit 1075 to generate a transmission signal, the processing including conversion into a time domain signal by inverse fast Fourier transform (IFFT), addition of a guard interval, generation of a baseband digital signal, conversion into an analog signal, quadrature modulation, conversion of an intermediate frequency signal into a high frequency signal (up convert), removal of an extra frequency component, amplification of power, or the like. The transmission signal output by the radio transmission unit 1077 is transmitted from the transmission/reception antenna 109.

<2.2. Configuration Example of Terminal Device 200 According to Present Embodiment>

Figure 8:
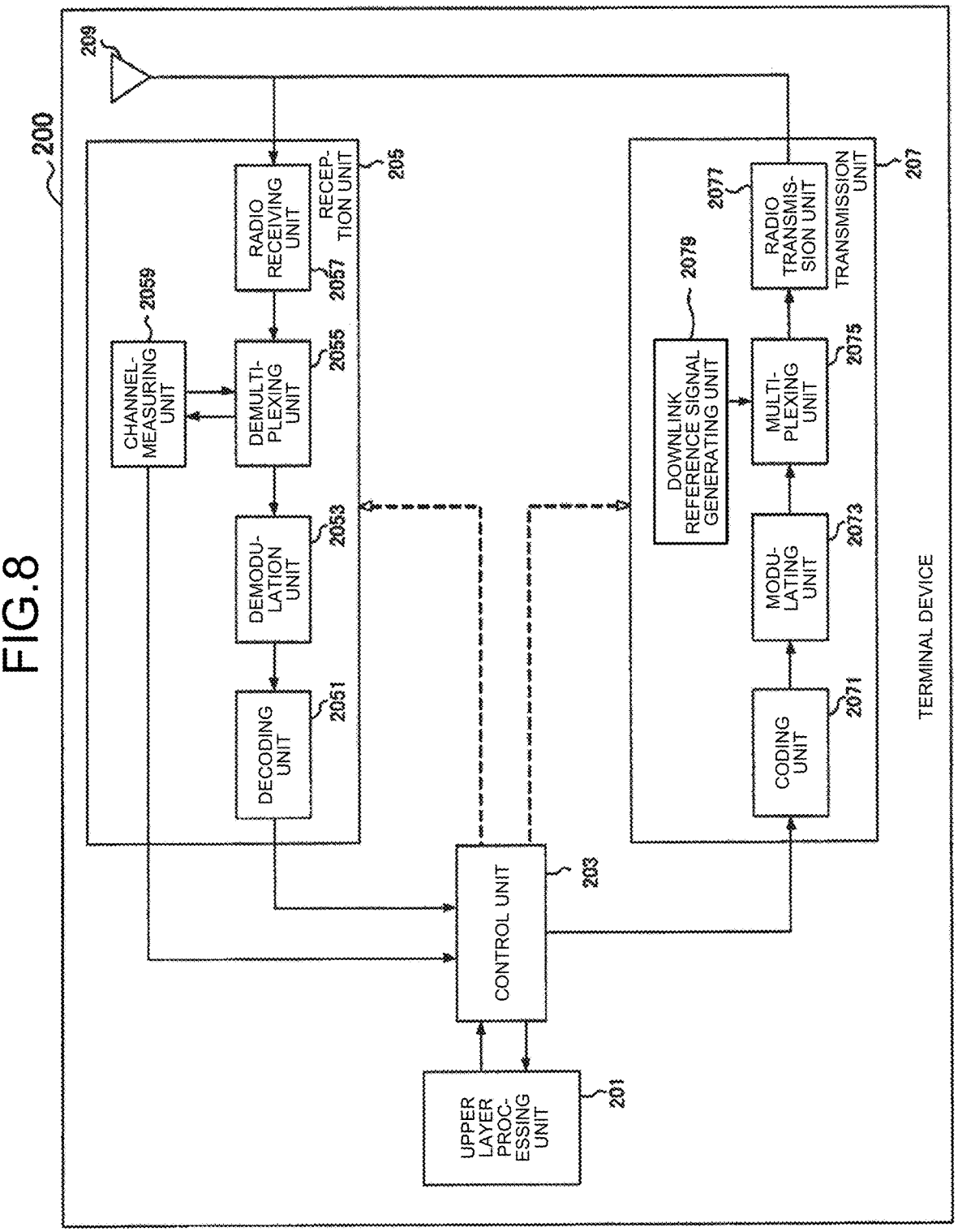
FIG. 8 is a schematic block diagram illustrating a configuration of the terminal device 200 according to the present embodiment.

FIG. 8 is a schematic block diagram illustrating a configuration of a terminal device 200 according to the present embodiment. As illustrated in the drawing, the terminal device 200 includes an upper layer processing unit 201, a control unit 203, a reception unit 205, a transmission unit 207, and a transmission/reception antenna 209. Furthermore, the reception unit 205 includes a decoding unit 2051, a demodulation unit 2053, a demultiplexing unit 2055, a radio receiving unit 2057, and a channel-measuring unit 2059. Furthermore, the transmission unit 207 includes a coding unit 2071, a modulating unit 2073, a multiplexing unit 2075, a radio transmission unit 2077, and an uplink reference signal generating unit 2079.

As described above, the terminal device 200 is configured to support one or more RATS. Some or all of the units included in the terminal device 200 illustrated in FIG. 8 can be individually configured according to the RATS. For example, the reception unit 205 and the transmission unit 207 can be individually configured for LTE and NR. Furthermore, in an NR cell, some or all of the units included in the terminal device 200 illustrated in FIG. 8 can be individually configured according to transmission signal parameter sets. For example, in a certain NR cell, the radio receiving unit 2057 and the radio transmission unit 2077 can be individually configured according to transmission signal parameter sets.

The upper layer processing unit 201 outputs uplink data (transport block) to the control unit 203. The upper layer processing unit 201 processes a medium access control (MAC) layer, a packet data convergence protocol (PDCP) layer, a radio link control (RLC) layer, a radio resource control (RRC) layer. Furthermore, the upper layer processing unit 201 generates control information to control the reception unit 205 and the transmission unit 207 and outputs the generated control information to the control unit 203.

The control unit 203 controls the reception unit 205 and the transmission unit 207 on the basis of the control information output from the upper layer processing unit 201. The control unit 203 generates control information for the upper layer processing unit 201 and outputs the control information to the upper layer processing unit 201. The control unit 203 receives an input of a decoded signal from the decoding unit 2051 and a channel estimation result from the channel-measuring unit 2059. The control unit 203 outputs a signal to be coded to a coding unit 2071. Furthermore, the control unit 203 may be used to control all or part of the terminal device 200.

The upper layer processing unit 201 performs processing and management relating to RAT control, radio resource control, subframe setting, scheduling control, and/or CSI report control. Processing and management in the upper layer processing unit 201 are performed on the basis of settings previously determined and/or setting based on control information set or reported from a base station apparatus 100. For example, control information from the base station apparatus 100 includes an RRC parameter, a MAC control element, or DCI. Furthermore, the processing and management in the upper layer processing unit 201 may be performed individually according to RATS. For example, the upper layer processing unit 201 individually performs processing and management for LTE and processing and management for NR.

In the RAT control in the upper layer processing unit 201, RAT management is performed. For example, in RAT control, LTE management and/or NR management is performed. The NR management includes setting and processing of a transmission signal parameter set in an NR cell.

In the radio resource control in the upper layer processing unit 201, management of setting information is performed in the terminal device 200. In the radio resource control in the upper layer processing unit 201, generation and/or management of uplink data (transport block), system information, an RRC message (RRC parameter), and/or a MAC control element (CE) is performed.

In subframe setting in the upper layer processing unit 201, subframe settings in the base station apparatus 100 and/or a base station apparatus 100 different from the base station apparatus 100 is managed. The subframe setting includes uplink or downlink setting for a subframe, subframe pattern setting, uplink-downlink setting, uplink reference UL-DL setting, and/or downlink reference UL-DL setting. Note that the subframe setting in the upper layer processing unit 201 is also referred to as terminal subframe setting.

In the scheduling control in the upper layer processing unit 201, control information for performing control relating to scheduling for the reception unit 205 and the transmission unit 207 is generated on the basis of DCI (scheduling information) from a base station apparatus 100.

In the CSI report control in the upper layer processing unit 201, control relating to CSI report to the base station apparatus 100 is performed. For example, in the CSI report control, setting relating to a CSI reference resource for assumption to calculate CSI in the channel-measuring unit 2059 is controlled. In the CSI report control, a resource (timing) used to report CSI is controlled on the basis of DCI and/or an RRC parameter.

The reception unit 205, according to control from the control unit 203, receives a signal transmitted from a base station apparatus 100 via the transmission/reception antenna 209, further performs reception processing, such as separation, demodulation, or decoding, and outputs information after the reception processing to the control unit 203. Note that the reception processing in the reception unit 205 is performed on the basis of setting previously determined or report or setting provided from the base station apparatus 100.

The radio receiving unit 2057 converts (down-converts) an uplink signal received via the transmission/reception antenna 209 into an intermediate frequency, removes an unnecessary frequency component, controls an amplification level to suitably maintain a signal level, performs quadrature demodulation on the basis of an in-phase component and quadrature component of the received signal, converts an analog signal to a digital signal, removes a guard interval (GI), and/or extracts a frequency domain signal by fast Fourier transform (FFT).

The demultiplexing unit 2055 separates a downlink channel, such as PHICH, PDCCH, EPDCCH, or PDSCH, a downlink synchronization signal, and/or a downlink reference signal from a signal input from the radio receiving unit 2057. The demultiplexing unit 2055 outputs the downlink reference signal to the channel-measuring unit 2059. The demultiplexing unit 2055 compensates for a channel for a downlink channel on the basis of a channel estimation value input from the channel-measuring unit 2059.

The demodulation unit 2053 demodulates, for a modulated symbol on a downlink channel, a received signal by using a modulation method such as BPSK, QPSK, 16QAM, 64QAM, or 256QAM. The demodulation unit 2053 separates and demodulates a MIMO-multiplexed downlink channel.

The decoding unit 2051 performs decoding processing on a demodulated coded bits on a downlink channel. Decoded downlink data and/or downlink control information is output to the control unit 203. The decoding unit 2051 performs decoding processing on PDSCH for each transport block.

The channel-measuring unit 2059 measures a channel estimation value, channel quality, and/or the like on the basis of a downlink reference signal input from the demultiplexing unit 2055 and outputs the measurement(s) to the demultiplexing unit 2055 and/or the control unit 203. The downlink reference signal used for measurement by the channel-measuring unit 2059 may be determined on the basis of at least a transmission mode and/or an RRC parameter, the transmission mode being set by another RRC parameter. For example, DL-DMRS measures a channel estimation value for performing channel compensation for PDSCH or EPDCCH. CRS measures a channel estimation value and/or a downlink channel, the channel estimation value being used for channel compensation for PDCCH or PDSCH, the downlink channel being used to report CSI. CSI-RS measures a downlink channel used to report CSI. The channel-measuring unit 2059 calculates reference signal received power (RSRP) and/or reference signal received quality (RSRQ) on the basis of the CRS, CSI-RS, or a detection signal and outputs the RSRP and/or RSRQ to the upper layer processing unit 201.

The transmission unit 207 performs transmission processing such as coding, modulation, and multiplexing on uplink control information and uplink data input from the upper layer processing unit 201, according to control by the control unit 203. For example, the transmission unit 207 generates and multiplexes an uplink channel, such as PUSCH or PUCCH, and/or an uplink reference signal to generate a transmission signal. Note that the transmission processing in the transmission unit 207 is performed on the basis of setting previously determined or setting or report provided from the base station apparatus 100.

The coding unit 2071 encodes a HARQ indicator (HARQ-ACK), uplink control information, and uplink data input from the control unit 203 by using predetermined coding method, such as block coding, convolutional coding, or turbo coding. The modulating unit 2073 modulates coded bits input from the coding unit 2071 by using a predetermined modulation method such as BPSK, QPSK, 16QAM, 64QAM, or 256QAM. The uplink reference signal generating unit 2079 generates an uplink reference signal on the basis of an RRC parameter or the like set in the terminal device 200. The multiplexing unit 2075 multiplexes a modulated symbol and uplink reference signal on each channel and arranges the multiplexed modulated symbol and uplink reference signal in a predetermined resource element.

The radio transmission unit 2077 performs processing on a signal from the multiplexing unit 2075 to generate a transmission signal, the processing including conversion into a time domain signal by inverse fast Fourier transform (IFFT), addition of a guard interval, generation of a baseband digital signal, conversion into an analog signal, quadrature modulation, conversion of an intermediate frequency signal into a high frequency signal (up convert), removal of an extra frequency component, amplification of power, or the like. The transmission signal output by the radio transmission unit 2077 is transmitted from the transmission/reception antenna 209.

3. Drone

<3.1. Use Cases>

Various use cases of a drone are conceivable. Hereinafter, examples of typical use cases will be described.

Entertainment

For example, a use case in which a camera is mounted to a drone to take a bird's eye view photo, moving image, or the like is conceivable. In recent years, it has been made possible to readily take a photo from a viewpoint inaccessible from the ground, for example, taking a photo of dynamic sports scene.

Transportation, Package Delivery

For example, a use case of a drone for transporting a package is conceivable. An attempt to introduce the service has already begun.

Public Safety

For example, a use case for monitoring, criminal tracking, or the like is conceivable. An attempt to introduce the service has already begun.

Search-and-Rescue

For example, a use case of a drone for searching a place where it is difficult for a person to access for rescue and support is conceivable.

Informative

For example, a use case of a drone for providing information is conceivable. Research and development on a drone base station that is a drone operating as a base station has already been conducted. The drone base station can provide a radio service from the sky and makes it possible to provide a radio service in an area in which it is difficult to install an Internet line.

Sensing

For example, a use case of a drone for measurement is conceivable. It is possible to make a measurement, which has been made manually, collectively by using a drone for efficient measurement.

Worker

For example, a use case of a drone as a labor force is conceivable. For example, a drone is expected to be used for various agricultural fields, such as crop-spraying or pollination.

Maintenance

For example, a use case of a drone for maintenance is conceivable. Use of a drone makes it possible to maintain a place, such as the back side of a bridge, that is difficult for a person to check.

<3.2. Drone Communication>

As described above, various use cases of a drone are considered. To achieve these use cases, various technical demands are imposed on the drone. Of the technical demands, communication is particularly exemplified as an important demand. Since the drone flies freely in a three-dimensional space, use of wire communication is not practical, and thus, use of radio communication is considered. In addition, radio communication is expected to be used for control of the drone (i.e., remote control), provision of information from the drone, and the like.

Communication by a drone may be referred to as D2X (Drone to X). In D2X communication, as a communication partner of a drone, for example, another drone, a cellular base station, Wi-Fi (registered trademark) access point, television (TV) tower, satellite, road side unit (RSU), a person (or a device held by the person), and the like are considered. The drone can be remotely controlled via D2D (Device to Device) communication with a device held by a person. The drone can also be connected to a cellular system or Wi-Fi for communication. For further increase in coverage, the drone may be communicably connected to a network using a broadcast system, such as TV, or a network using satellite communication. Thus, it is considered that the drone will have various communication links.

<3.3. Flight-Related Information>

Hereinafter, flight-related information that is flight-related information of a drone will be specifically described.

The flight-related information includes information that is measured, detected, sensed, estimated or recognized in the flight of a drone. For example, the flight-related information may include flight-related altitude information of a drone, flight-related battery information, flight-related positional information, flight-related status information, and/or the like. The flight-related information may include information obtained by combining a plurality of pieces of flight-related information.

The flight-related altitude information can include information about an altitude at which a drone is currently flying, information about an altitude at which a drone is capable of flying (i.e., maximum altitude and minimum altitude), and the like. For example, a base station apparatus 100 can determine whether to form a beam according to the altitude information of a drone.

The flight-related battery information can include information about current remaining battery capacity in a drone, information about a flight endurance of a drone, information about battery capacity, information about the power consumption of a drone, and the like. In addition, the battery information of a drone can include information that is obtained on the basis of an absolute value, such as capacity or electric energy, a relative value, such as a remaining capacity or the like relative to the battery capacity, and a percentage or level, the level being obtained by a predetermined calculation. For example, a drone can be configured to reduce the frequency of reporting measurement information to save battery power when the remaining battery capacity is small or, in contrast, to increase the frequency of reporting measurement information for security when the remaining battery capacity is small.

The flight-related positional information can include latitude and longitude information, information indicating a relative position from a point such as a predetermined base station apparatus 100 or a predetermined reference point, and information indicating whether or not a drone is within a predetermined area. For example, a drone can be configured to increase the frequency of reporting measurement information during flying near a no-fly zone.

The flight-related status information (hereinafter also referred to as flight status information) can include information indicating whether a drone is flying or landing, information indicating whether a drone is flying by manual control or flying by autopilot (autonomous flight), information indicating whether a propeller of a drone is rotating, information indicating whether a drone is in contact with the ground, or the like. For example, a drone can be configured to increase the frequency of reporting measurement information during a flight and reduce the frequency of reporting measurement information during landing.

Furthermore, the flight-related information can include information about a set direction (azimuth), set speed, and/or set altitude of a flight schedule of a drone. Such information is also referred to as a flight path. The flight path may be provided for a base station apparatus 100 that performs radio resource control. The base station apparatus 100 performs radio resource control for a drone on the basis of the flight path of the drone. A method of providing the flight path includes a method of providing the flight path by a drone itself, a method of providing the flight path by a pilot (or a control device) connected to a local network, a method of providing the flight path by an air traffic control (or air traffic control device) through a cellular network, or a combination of the methods described above.

Furthermore, the flight-related information can include information about accuracy or likelihood depending on a drone or environment to each piece of information such as the altitude information. For example, the information about accuracy or likelihood depending on a drone includes information based on the accuracy of a sensor of the drone. The information about accuracy or likelihood depending on an environment includes information based on weather, temperature, wind speed or atmospheric pressure.

4. Technical Features

Hereinafter, the technical features of the present embodiment will be described in detail.

<4.1. Virtual Cell>

In the present embodiment, a virtual cell can be provided on a physical cell.

The virtual cell can be regarded as a unit for setting a radio resource or a reference for a transmission/reception point. A terminal device is configured to receive different radio resource control (RRC) settings for each virtual cell. For example, independent PDCCH setting, EPDCCH setting, RACH setting, and PUCCH setting can be set in a terminal device, in each virtual cell. It is assumed that signals transmitted from different virtual cells are transmitted from different transmission/reception points, in the terminal device.

The virtual cells according to the present embodiment are configured in a three-dimensional form. For example, even at the same position, different virtual cells can be set to different altitudes.

As an example, virtual cell deployment is set for each region where a plurality of physical cells overlaps each other. A specific example will be described with reference to FIG. 9. In space at a lower altitude, virtual cells #1 to #3 are provided from base station apparatuses #1 to #3. Furthermore, in space at a higher altitude, virtual cells #4 to #7 are provided. The virtual cell #5 is provided in an area where the coverage of the base station apparatus #1 and the coverage of the base station apparatus #2 overlap. The virtual cell #6 is provided in an area where the coverage of the base station apparatus #2 and the base station apparatus #3 overlap.

Setting virtual cells in the air and resource control for the respective virtual cells make it possible to perform appropriate cell connection processing and inter-cell interference control.

Note that the virtual cells can be set in a superimposed manner. For example, a virtual cell for a terminal device with a lower moving speed and a virtual cell for a terminal device with a higher moving speed are provided in a superimposed manner.

An identity (virtual cell ID) that identifies a virtual cell can be set for each virtual cell. A terminal device performs transmission and reception with the virtual cell by using a virtual cell identity in addition to a physical cell identification.

In a virtual cell, PDSCH is scrambled by using the virtual cell identity. A terminal device descrambles the PDSCH by using the virtual cell identity.

In a virtual cell, PDCCHs are interleaved on time/frequency by using the virtual cell identity. A terminal device deinterleaves the PDCCH by using the virtual cell identity.

In a virtual cell, a transmission resource is determined on the basis of the virtual cell identity, for PDCCH. A terminal device monitors the PDCCH on the basis of the virtual cell identity.

In a virtual cell, PBCH is scrambled by using the virtual cell identity. A terminal device descrambles the PBCH by using the virtual cell identity.

In a virtual cell, a sequence of a downlink reference signal (CSI-RS, DMRS, tracking RS) is generated on the basis of the virtual cell identity. A terminal device recognizes the sequence of a downlink reference signal by using the virtual cell identity.

Note that a period and/or time offset of a system information (SI) window may be different for each virtual cell. The period and/or time offset of the SI window may be determined by the virtual cell identity. The period and/or time offset of the SI window is reported to a terminal device by MIB or previously acquired SIB (stored SIB). On the other hand, when a terminal device cannot acquire the period and/or time offset of the SI window from a base station apparatus, the terminal device applies a period and/or time offset of an SI window of initial value and attempts to acquire SIB.

In a virtual cell, radio resource management (RRM) measurement is performed using a synchronization signal and/or a reference signal associated with the virtual cell identity. For example, a terminal device measures RSRP, RSRQ, and/or SS-SINR by using SSS associated with the virtual cell identity. For example, a terminal device measures RSRP, RSRQ, and/or RS-SINR by using CSI-RS associated with the virtual cell identity.

In a virtual cell, radio link monitoring (RLM) measurement is performed using a synchronization signal and/or a reference signal associated with the virtual cell identity. For example, a terminal device connected to the virtual cell measures the communication quality of a serving cell by using SSS associated with the virtual cell identity. For example, a terminal device connected to the virtual cell measures the communication quality of a serving cell by using CSI-RS associated with the virtual cell identity.

A physical channel and DMRS transmitted in a virtual cell are preferably quasi-co-located (QCL) with a reference signal associated with the virtual cell identity. QCL is an index that indicates a transmission point in terms of channel and beam characteristics. In the case of QCL, the terminal device assumes that the two related physical signals/physical channels are transmitted from the same transmission point.

A plurality of virtual cells may be set in a terminal device. In other words, the terminal device may be connected to a plurality of virtual cells. The terminal device may use a plurality of virtual cell identities to simultaneously perform transmission and reception.

Arrangement of virtual cells is controlled by a core network. The arrangement of virtual cells and assignment of virtual cell identities are preferably determined by MME.

Setting of CSI-RS used for the RRM measurement of a virtual cell is preferably included in system information. In the setting of CSI-RS used for the RRM measurement, a CSI-RS antenna port, a resource (resource elements and transmission cycle) on which CSI-RS is transmitted, a CSI-RS scrambling sequence, a CDM type, and/or a QCL parameters with a physical cell are set. Furthermore, the setting of CSI-RS used for the RRM measurement is associated with a virtual cell identity. After determining the virtual cell identity, the setting of CSI-RS corresponding to the virtual cell identity is applied to a terminal device.

In a virtual cell, PDSCH and PUSCH are desirably scheduled by EPDCCH. DMRS of the EPDCCH is associated with the virtual cell identity. DMRS of the EPDCCH is CSI-RS and QCL associated with the virtual cell identity.

A terminal device that is connectable to a virtual cell can perform RRM measurement using CSI-RS in an RRC idle state. Specifically, the terminal device that is connectable to a virtual cell can measure CSI-RSRP and/or CSI-RSRQ in the RRC idle state.

The terminal device that is connectable to a virtual cell is configured to determine cell connection and cell reconnection on the basis of the reception quality of CSI-RS. Specifically, the value of CSI-RSRP, CSI-RSRQ, or CSI-SINR is applied to a cell connection index (cell selection criterion).

Note that RS-SINR interference using CSI-RS may be calculated using a ZP-CSI-RS resource element or may be calculated using an NZP-CSI-RS resource element.

A terminal device can switch between a procedure of performing cell connection by using a physical cell identification and a procedure of performing cell connection using a virtual cell identity, according to a predetermined condition. As a specific example, there are cases where a cell provided on the ground is designed on the basis of the physical cell identifications and where a cell provided in the air is designed on the basis of the virtual cell identity. As another specific example, a cell provided from a terrestrial network is designed on the basis of the physical cell identification, and a cell provided from a non-terrestrial network such as a satellite station is designed on the basis of the virtual cell identity.

As an example, a terminal device can switch between the procedure of performing cell connection by using a physical cell identification and the procedure of performing cell connection using a virtual cell identity, according to whether the terminal device acquires information about the virtual cell. For example, when information about a virtual cell is acquired, the procedure of performing cell connection using a virtual cell identity is applied, and otherwise, the procedure of performing cell connection by using a physical cell identification is applied. Alternatively, when instruction information for connection to a virtual cell is obtained, the procedure of performing cell connection using a virtual cell identity is applied, and otherwise, the procedure of performing cell connection by using a physical cell identification is applied.

As an example, a terminal device can switch between a procedure of performing cell connection by using a physical cell identification and a procedure of performing cell connection using a virtual cell identity, according to according to the altitude of the terminal device. For example, when the altitude of the terminal device is lower than a predetermined altitude (e.g., the altitude of a base station apparatus), the procedure of performing cell connection by using a physical cell identification is applied, and when the altitude of the terminal device is higher than the predetermined altitude (e.g., the altitude of the base station apparatus), the procedure of performing cell connection using a virtual cell identity is applied. For example, for takeoff, the procedure of performing cell connection using a virtual cell identity is applied, and otherwise, the procedure of performing cell connection by using a physical cell identification is applied. The predetermined altitude may be reported from the base station apparatus.

As an example, a terminal device can switch between a procedure of performing cell connection by using a physical cell identification and a procedure of performing cell connection using a virtual cell identity, according to the speed of the terminal device. For example, when the speed of the terminal device is smaller than a predetermined speed, a procedure of performing cell connection by using a physical cell identification is applied, and when the speed of the terminal device is larger than the predetermined speed, the procedure of performing cell connection using a virtual cell identity is applied. A speed status may be managed by a mobility status or may be determined by a speed sensor.

As an example, a terminal device can switch between a procedure of performing cell connection by using a physical cell identification and a procedure of performing cell connection using a virtual cell identity, according to an arrival angle of a received signal. For example, when a signal is received from above the terminal device, the procedure of performing cell connection by using a physical cell identification is applied, and when a signal is received from below the terminal device, the procedure of performing cell connection using a virtual cell identity Is applied.

As an example of the procedure of performing cell connection by using a physical cell identification, cell connection is performed by using CRS.

As an example of the procedure of performing cell connection by using a physical cell identification, cell connection is performed by using PDCCH.

As an example of the procedure of performing cell connection using a virtual cell identity, cell connection is performed by using CSI-RS.

As an example of the procedure of performing cell connection using a virtual cell identity, cell connection is performed by using EPDCCH.

<4.2. Method of Reporting and Setting Virtual Cell Identity>

A base station apparatus report all or some of virtual cell identities set on the coverage of the base station apparatus to a terminal device in the coverage. Specifically, the base station apparatus reports a set (table, formula) of virtual cell identities to the terminal device. The terminal device selects a virtual cell identity to be applied, from the set of virtual cell identities, according to a condition.

The set of virtual cell identities is preferably reported using system information. Note that when the set of virtual cell identities is reported by MIB, PDCCH and PDSCH corresponding to transmission of SIB are preferably transmitted on the basis of a virtual cell identity. Note that when the set of virtual cell identities is reported by SIB1, PDCCH and PDSCH corresponding to transmission of another SIB is preferably transmitted on the basis of a virtual cell identity. Note that the setting about a virtual cell may be reported by dedicated SIB.

Figure 10:
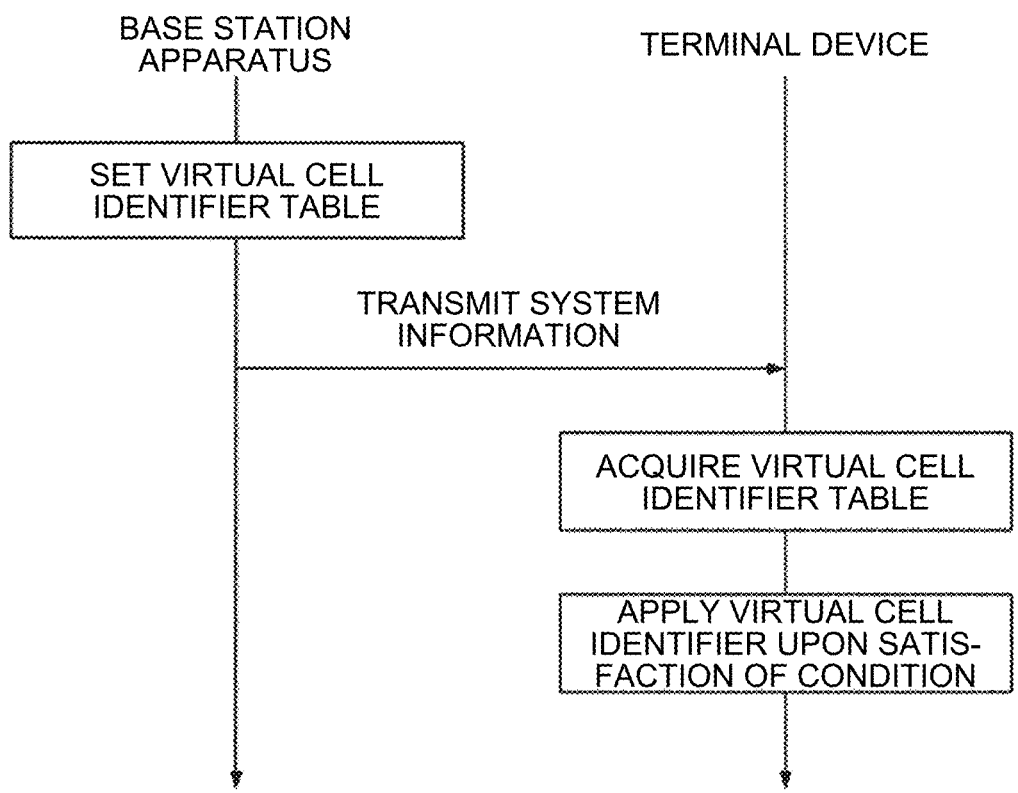
FIG. 10 is a diagram illustrating an example of a virtual cell identity setting sequence.

FIG. 10 illustrates an example of a virtual cell identity setting sequence. Firstly, a base station apparatus sets a virtual cell identity table. Then, the base station apparatus reports the virtual cell identity table to a terminal device. The terminal device acquires the virtual cell identity table and selects a virtual cell identity to be applied, according to the selection criteria.

As an example, the selection criteria for a virtual cell identity includes the position of a terminal device. When the position of a terminal device is within a predetermined altitude range, a corresponding virtual cell identity is selected from the set. For example, when the position of a terminal device is within a predetermined altitude range #1, a virtual cell identity #1 is selected, and when the position of a terminal device is within a predetermined altitude range #2, a virtual cell identity #2 Is selected. Furthermore, when a terminal device is positioned below a predetermined altitude, no virtual cell identity needs to be applied.

As an example, the selection criteria for a virtual cell identity includes power received from a reference signal associated with a physical cell. A corresponding virtual cell identity is selected from the set, according to a relative value of power received from a reference signal associated with a physical cell, including surrounding cells. For example, when maximum power is received from a cell #1 and a relative value between power received from the surrounding cells and power received from the cell #1 is larger than a predetermined threshold value, the virtual cell identity #1 is selected. For example, when maximum power is received from the cell #1 and a relative value between power received from the surrounding cells and power received from the cell #1 is smaller than the predetermined threshold value, the virtual cell identity #2 is selected. For example, when maximum power is received from a cell #2 and a relative value between power received from the surrounding cells and power received from the cell #2 is larger than a predetermined threshold value, a virtual cell identity #3 is selected.

As an example, the selection criteria for a virtual cell identity includes a direction of arrival of a reference signal associated with a physical cell. When a reference signal associated with a physical cell, including surrounding cells, arrives from a predetermined direction, a corresponding virtual cell identity is selected from the set. For example, when the direction of arrival of a reference signal is within a predetermined range #1 of the direction of arrival, the virtual cell identity #1 is selected, and when the direction of arrival of a reference signal is within a predetermined range #2 of the direction of arrival, the virtual cell identity #2 is selected.

As an example, the selection criteria for a virtual cell identity includes a moving speed of a terminal device. When the moving speed of a terminal device is within a predetermined range, a corresponding virtual cell identity is selected from the set.

As an example, the selection criteria for a virtual cell identity includes a flight path of a terminal device. When the flight path of a terminal device is a predetermined flight path, a corresponding virtual cell identity is selected from the set. In other words, the flight path has an index that is associated with a virtual cell identity.

As an example, the selection criteria for a virtual cell identity includes a traffic type requested by a terminal device. According to the requirement for the traffic type (data rate, delay, reliability), a corresponding virtual cell identity is selected from the set. For example, when the traffic type requested by a terminal device corresponds to eMBB, the virtual cell identity #1 is selected, and when the traffic type requested by a terminal device corresponds to URLLC, the virtual cell identity #2 is selected.

Note that the selection criteria for a virtual cell identity may employ a combination of the above descriptions. For example, a corresponding virtual cell identity is selected from the set, according to a combination of the position of a terminal device and the direction of arrival of a reference signal. Specifically, when the terminal device is located at a predetermined altitude and a signal arrives from above the terminal device, the virtual cell identity #1 is selected, and when the terminal device is located at the predetermined altitude and a signal arrives from below the terminal device, the virtual cell identity #2 is selected.

The reference signal associated with a physical cell used for the selection criteria for a virtual cell identity includes, for example, CRS and a discovery reference signal (DRS).

5. Application Examples

The technology according to the present disclosure is applicable to various products. For example, a base station apparatus 100 may be achieved as any type of evolved Node B (eNB), such as a macro eNB or small eNB. The small eNB may be eNB that covers a cell smaller than a macro cell, such as a pico eNB, micro eNB, or home (femto) eNB. Instead, the base station apparatus 100 may be achieved as another type of base station, such as NodeB or base transceiver station (BTS). The base station apparatus 100 may include a main body (also referred to as a base station apparatus) that controls radio communication, and one or more remote radio heads (RRHs) that are arranged at different positions from the main body. Furthermore, various types of terminals, which is described later, may operate as the base station apparatus 100 by temporarily or semi-permanently performing a base station function.

Furthermore, for example, a terminal device 200 may be achieved as a mobile terminal such as a smartphone, tablet PC (personal computer), notebook PC, portable game terminal, mobile/dongle mobile router, or a digital camera, or an in-vehicle terminal, such as a car navigation device. Furthermore, the terminal device 200 may be achieved as a terminal (also referred to as a machine type communication (MTC) terminal) that performs machine to machine (M2M) communication. Furthermore, the terminal device 200 may employ a radio communication module (e.g., an integrated circuit module including one die) that is mounted on these terminals.

<5.1. Application Examples Relating to Base Station Apparatus>

First Application Example

Figure 11:
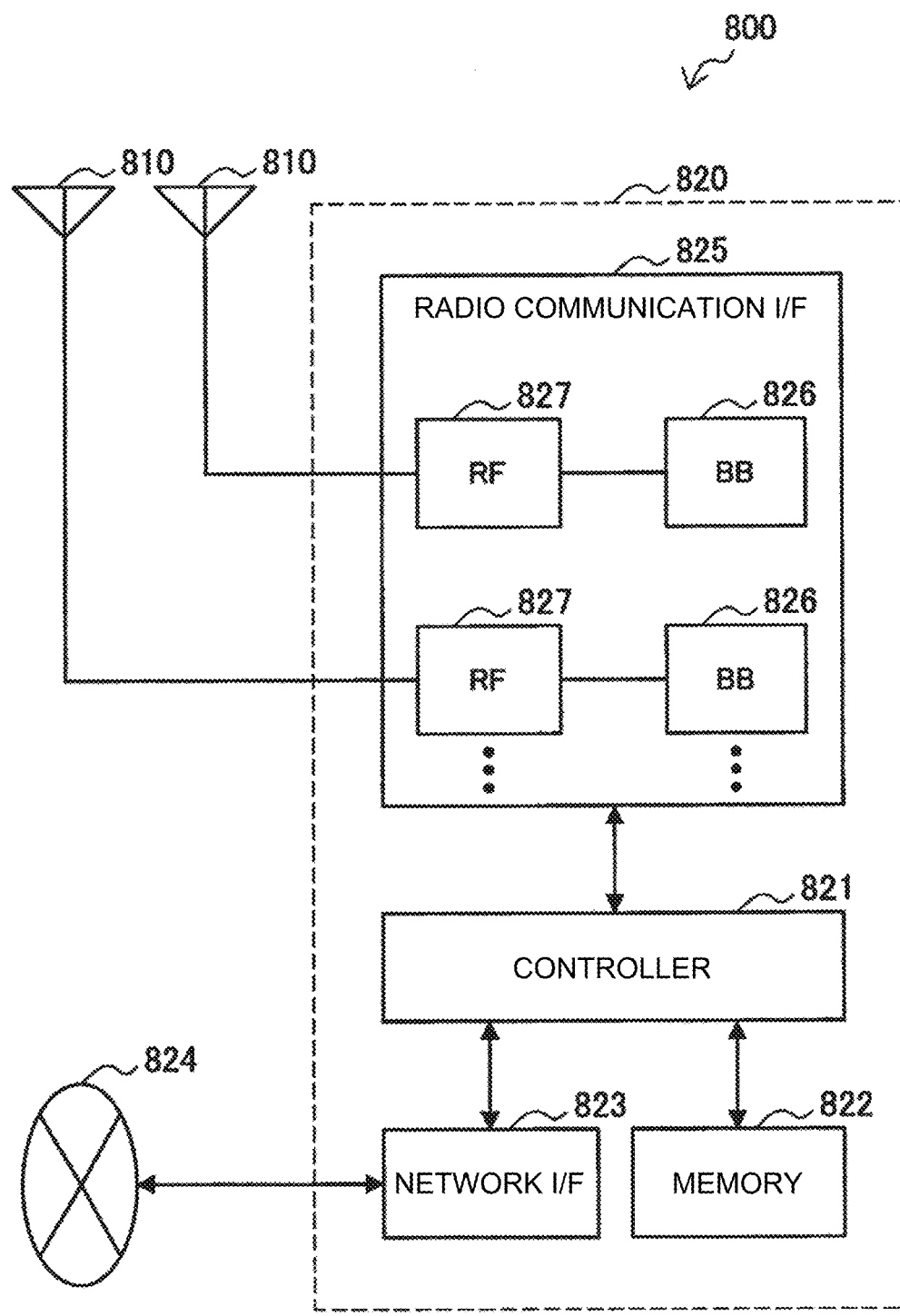
FIG. 11 is a block diagram illustrating a first example of a schematic configuration of eNB to which a technology according to the present disclosure is applicable.

FIG. 11 is a block diagram illustrating a first example of a schematic configuration of eNB to which a technology according to the present disclosure is applicable. An eNB 800 includes one or more antennas 810 and a base station apparatus 820. The respective antennas 810 and the base station apparatus 820 are connectable to each other via an RF cable.

Each of the antennas 810 includes a single or a plurality of antenna elements (e.g., a plurality of antenna elements constituting a MIMO antenna) and is used for transmission and reception of radio signals by the base station apparatus 820. As illustrated in FIG. 11, the eNB 800 may include a plurality of antennas 810 so that the plurality of antennas 810 may correspond to, for example, a plurality of frequency bands used by the eNB 800. Note that FIG. 11 illustrates an example of the eNB 800 including the plurality of antennas 810, but the eNB 800 may have a single antenna 810.

The base station apparatus 820 includes a controller 821, a memory 822, a network interface 823, and a radio communication interface 825.

The controller 821 may be, for example, a CPU or DSP and operates various functions of an upper layer of the base station apparatus 820. For example, the controller 821 generates a data packet from data in s signal processed by the radio communication interface 825 and transfers the generated packet via the network interface 823. The controller 821 may generate a bundled packet by bundling data from a plurality of baseband processors and transfer the generated bundled packet. Furthermore, the controller 821 may have a logical function that performs control such as radio resource control, radio bearer control, mobility management, admission control, or scheduling. Furthermore, the control may be performed in cooperation with surrounding eNBs or core network nodes. The memory 822 includes RAM and ROM and stores a program executed by the controller 821 and various control data (e.g., a terminal list, transmission power data, scheduling data, and the like).

The network interface 823 is a communication interface to connect the base station apparatus 820 to a core network 824. The controller 821 may communicate with a core network node or another eNB via the network interface 823. In that case, the eNB 800 and the core network node or another eNB may be connected to each other by a logical interface (e.g., S1 interface or X2 interface). The network interface 823 may employ a wire communication interface or may employ a radio communication interface for wireless backhaul. When the network interface 823 employs the radio communication interface, the network interface 823 may use a higher frequency band that is higher than a frequency band used by the radio communication interface 825, for radio communication.

The radio communication interface 825 supports any of cellular communication systems such as long term evolution (LTE) and LTE-Advanced and provides a wireless connection to a terminal located in a cell of the eNB 800 via an antenna 810. The radio communication interface 825 is typically configured to include a baseband (BB) processor 826, an RF circuit 827, and the like. The BB processor 826 may perform, for example, coding/decoding, modulation/demodulation, multiplexing/demultiplexing, or the like to perform various signal processing for each layer (e.g., L1, medium access control (MAC), radio link control (RLC), and packet data convergence protocol (PDCP)). The BB processor 826 may have some or all of the above-described logical functions instead of the controller 821. The BB processor 826 may employ a module including a memory that stores a communication control program, a processor that executes the program, and related circuits, and the function of the BB processor 826 may be changeable by updating the program. Furthermore, the module may employ a card or a blade configured to be inserted into a slot of the base station apparatus 820 or may employ a chip configured to be mounted on the card or the blade. Meanwhile, the RF circuit 827 may include a mixer, a filter, an amplifier, and the like and transmits and receives radio signals via the antenna 810.

As illustrated in FIG. 11, the radio communication interface 825 may include a plurality of BB processors 826 so that the plurality of BB processors 826 may correspond to, for example, a plurality of frequency bands used by the eNB 800. Furthermore, as illustrated in FIG. 11, the radio communication interface 825 may include a plurality of RF circuits 827 so that the plurality of RF circuits 827 may correspond to, for example, the plurality of antenna elements. Note that FIG. 11 illustrates an example of the radio communication interface 825 including the plurality of BB processors 826 and the plurality of RF circuits 827, but the radio communication interface 825 may include a single BB processor 826 or a single RF circuit 827.

In the eNB 800 illustrated in FIG. 11, the upper layer processing unit 101, the control unit 103, the reception unit 105, and/or the transmission unit 107, which have been described with reference to FIG. 8, may be implemented in the radio communication interface 825 (e.g., the BB processor 826 and/or the RF circuit 827), the controller 821, and/or the network interface 823. For example, the radio communication interface 825, the controller 821, and/or the network interface 823 is configured to transmit first control information and second control information, and transmit corresponding third control information in response to control information request received. For example, in the processors included in the radio communication interface 825, functions for performing these operations may be implemented. As a device that performs such operations, the eNB 800, the base station apparatus 820, or the above-described module may be provided, or a program for causing a processor to perform the operations described above may be provided. Furthermore, a readable recording medium on which the program is recorded may be provided. Furthermore, the transmission/reception antenna 109 may be implemented in each antenna 810.

Second Application Example

Figure 12:
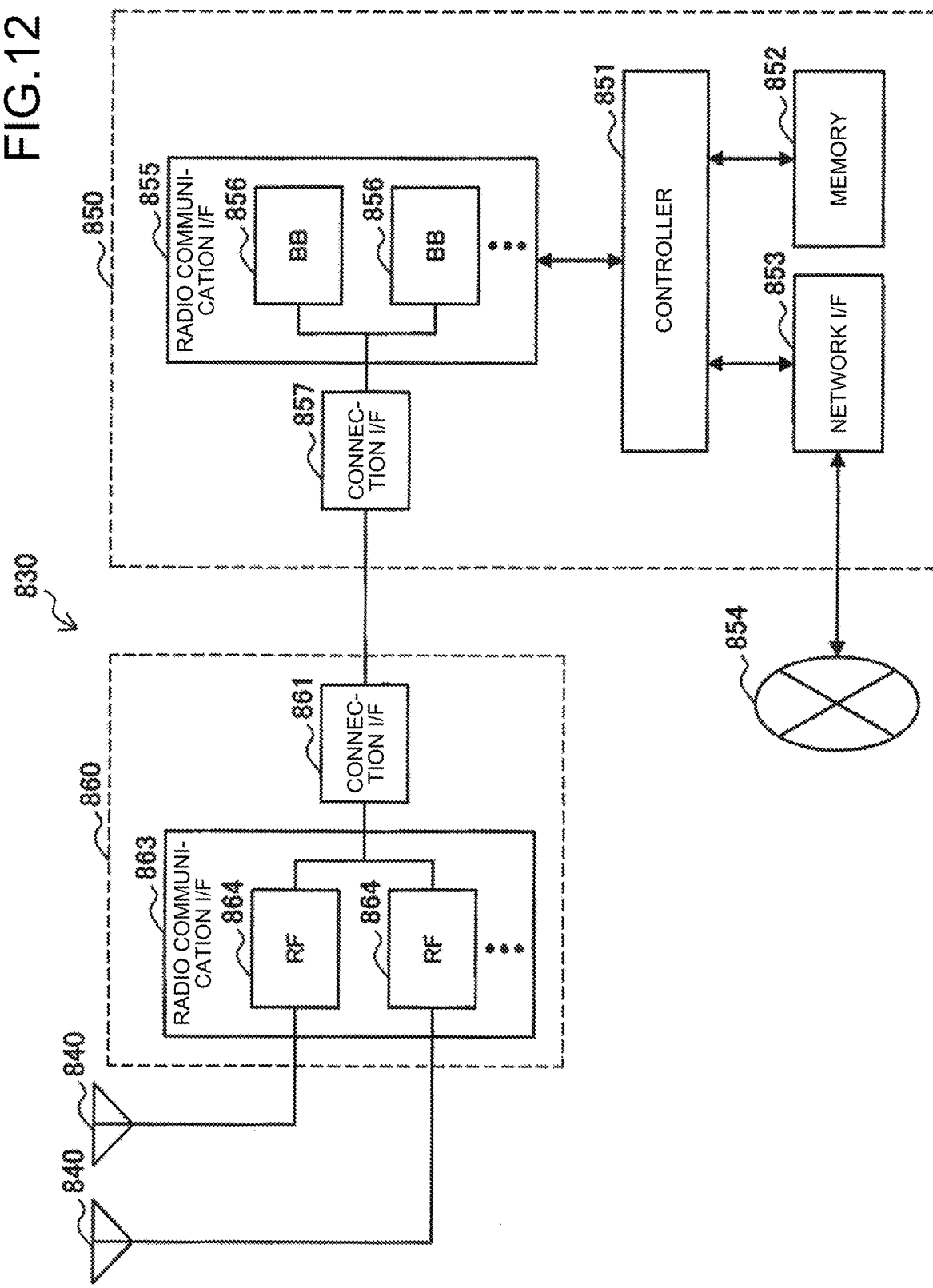
FIG. 12 is a block diagram illustrating a second example of a schematic configuration of eNB to which a technology according to the present disclosure is applicable.

FIG. 12 is a block diagram illustrating a second example of a schematic configuration of eNB to which a technology according to the present disclosure is applicable. An eNB 830 includes one or more antennas 840, a base station apparatus 850, and an RRH 860. The respective antennas 840 and the RRH 860 are connectable to each other via an RF cable. Furthermore, the base station apparatus 850 and the RRH 860 are connectable to each other by a high-speed line such as an optical fiber cable.

Each of the antennas 840 includes a single or a plurality of antenna elements (e.g., a plurality of antenna elements constituting a MIMO antenna) and is used for transmission and reception of radio signals by the RRH 860. As illustrated in FIG. 27, the eNB 830 may include a plurality of antennas 840 so that the plurality of antennas 840 may correspond to, for example, a plurality of frequency bands used by the eNB 830. Note that FIG. 12 illustrates an example of the eNB 830 including the plurality of antennas 840, but the eNB 830 may have a single antenna 840.

The base station apparatus 850 includes a controller 851, a memory 852, a network interface 853, a radio communication interface 855, and a connection interface 857. The controller 851, the memory 852, and the network interface 853 are configured similarly to the controller 821, the memory 822, and the network interface 823 described with reference to FIG. 11.

The radio communication interface 855 supports any of cellular communication systems such as LTE and LTE-Advanced and provides a wireless connection to a terminal located in a sector corresponding to the RRH 860 via the RRH 860 and an antenna 840. The radio communication interface 855 is typically configured to include a BB processor 856 and the like. The BB processor 856 is configured similarly to the BB processor 826 described with reference to FIG. 11, except that the BB processor 856 is connected to an RF circuit 864 of the RRH 860 via the connection interface 857. As illustrated in FIG. 12, the radio communication interface 855 may include a plurality of BB processors 856 so that the plurality of BB processors 856 may correspond to, for example, a plurality of frequency bands used by the eNB 830. Note that FIG. 12 illustrates an example of the radio communication interface 855 including the plurality of BB processors 856, but the radio communication interface 855 may include a single BB processor 856.

The connection interface 857 is an interface to connect the base station apparatus 850 (radio communication interface 855) to the RRH 860. The connection interface 857 may employ a communication module that connects the base station apparatus 850 (radio communication interface 855) and the RRH 860 to perform communication on the high-speed line.

Furthermore, the RRH 860 includes a connection interface 861 and a radio communication interface 863.

The connection interface 861 is an interface to connect the RRH 860 (radio communication interface 863) to the base station apparatus 850. The connection interface 861 may employ a communication module for communication on the high-speed line.

The radio communication interface 863 transmits and receives radio signals via the antennas 840. The radio communication interface 863 is typically configured to include an RF circuit 864 and the like. The RF circuit 864 may include a mixer, a filter, an amplifier, and the like and transmits and receives radio signals via the antennas 840. As illustrated in FIG. 12, the radio communication interface 863 may include a plurality of RF circuits 864 so that the plurality of RF circuits 864 may correspond to, for example, the plurality of antenna elements. Note that FIG. 12 illustrates an example of the radio communication interface 863 including the plurality of RF circuits 864, the radio communication interface 863 may include a single RF circuit 864.

In the eNB 830 illustrated in FIG. 12, the upper layer processing unit 101, the control unit 103, the reception unit 105, and/or the transmission unit 107, which have been described with reference to FIG. 8, may be implemented in the radio communication interface 855, the radio communication interface 863 (e.g., the BB processor 856 and/or the RF circuit 864), the controller 851 and/or the network interface 853. For example, the radio communication interface 855, the radio communication interface 863, the controller 851, and/or the network interface 853 is configured to transmit first control information and second control information, and transmit corresponding third control information in response to a control information request received. For example, in the processors included in the radio communication interface 855 and/or the radio communication interface 863, functions for performing these operations may be implemented. As a device that performs such operations, the eNB 830, the base station apparatus 850, or the above-described module may be provided, or a program for causing a processor to perform the operations described above may be provided. Furthermore, a readable recording medium on which the program is recorded may be provided. Furthermore, the transmission/reception antenna 109 may be implemented in each antenna 840.

<5.2. Application Example Relating to Terminal Device>

First Application Example

Figure 13:
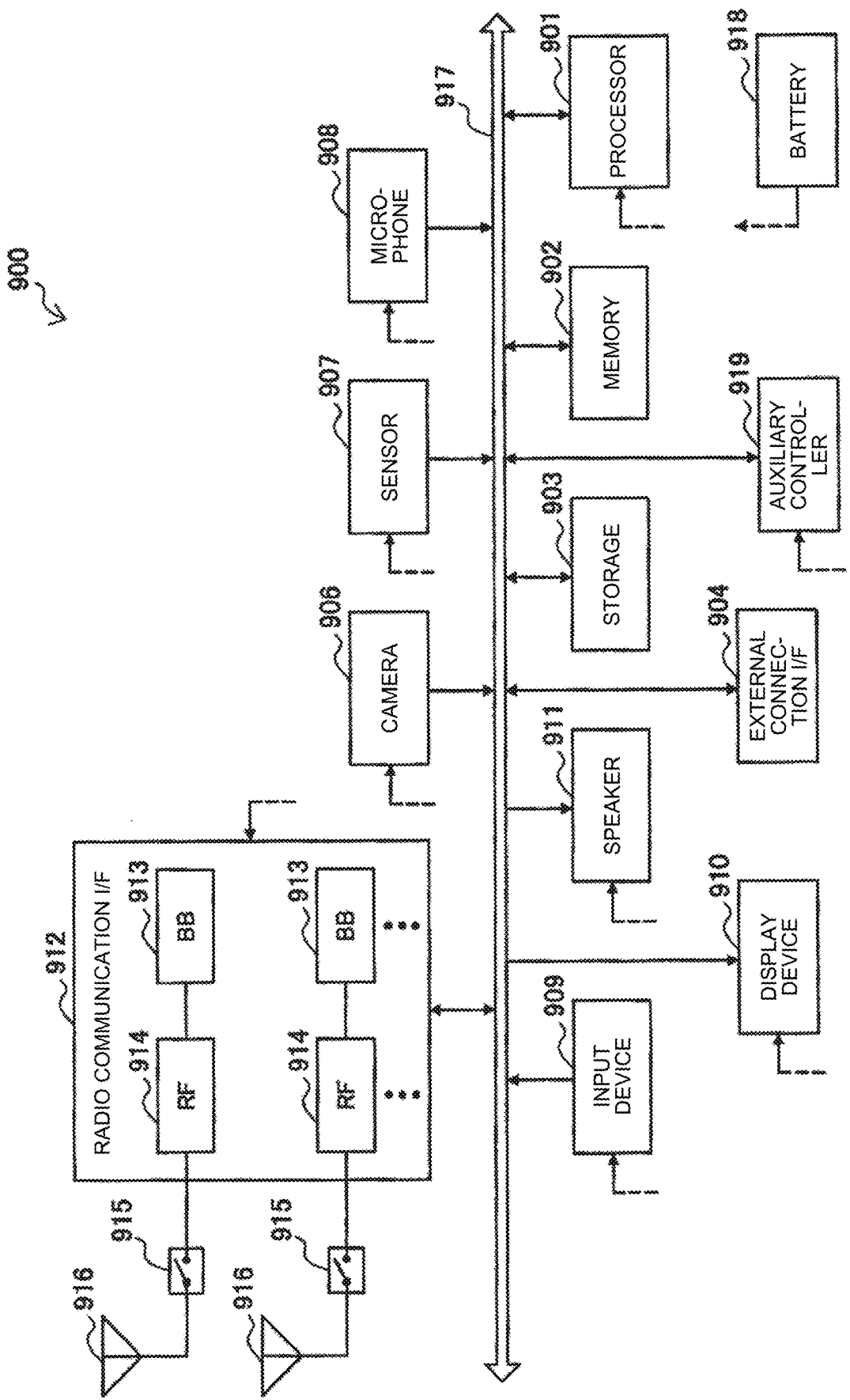
FIG. 13 is a block diagram illustrating an example of a schematic configuration of a smartphone to which a technology according to the present disclosure is applicable.

FIG. 13 is a block diagram illustrating an example of a schematic configuration of a smartphone 900 to which a technology according to the present disclosure is applicable. The smartphone 900 includes a processor 901, a memory 902, a storage 903, an external connection interface 904, a camera 906, a sensor 907, a microphone 908, an input device 909, a display device 910, a speaker 911, a radio communication interface 912, and one or more antenna switches 915, one or more antennas 916, a bus 917, a battery 918, and an auxiliary controller 919.

The processor 901 may be, for example, a CPU or system on chip (SoC) and controls functions of an application layer and other layers of the smartphone 900. The memory 902 includes RAM and ROM and stores programs and data executed by the processor 901. The storage 903 may include a storage medium such as a semiconductor memory or a hard disk. The external connection interface 904 is an interface to connect an external device such as a memory card or a universal serial bus (USB) device to the smartphone 900.

The camera 906 includes an imaging element such as a charge coupled device (CCD) or a complementary metal oxide semiconductor (CMOS) and generates a captured image. The sensor 907 can include a sensor group such as a positioning sensor, gyro-sensor, geomagnetic sensor, or acceleration sensor. The microphone 908 converts sound input to the smartphone 900 into an audio signal. The input device 909 includes, for example, a touch sensor that detects a touch on a screen of the display device 910, a keypad, a keyboard, a button, a switch, or the like and receives an operation or information input from the user. The display device 910 includes a screen such as a liquid crystal display (LCD) or organic light emitting diode (OLED) display and displays an output image of the smartphone 900. The speaker 911 converts an audio signal output from the smartphone 900 into sound.

The radio communication interface 912 supports any of the cellular communication systems such as LTE and LTE-Advanced and performs radio communication. The radio communication interface 912 is typically configured to include a BB processor 913, an RF circuit 914, and the like. The BB processor 913 may perform, for example, coding/decoding, modulation/demodulation, multiplexing/demultiplexing, or the like to perform various signal processing for radio communication. Meanwhile, the RF circuit 914 may include a mixer, a filter, an amplifier, and the like and transmits and receives radio signals via the antenna 916. The radio communication interface 912 may employ a one-chip module in which the BB processor 913 and the RF circuit 914 are integrated. As illustrated in FIG. 13, the radio communication interface 912 may include a plurality of BB processors 913 and a plurality of RF circuits 914. Note that FIG. 13 illustrates an example of the radio communication interface 912 including the plurality of BB processors 913 and a plurality of RF circuits 914, but the radio communication interface 912 may include a single BB processor 913 or a single RF circuit 914.

Furthermore, the radio communication interface 912 may support, in addition to a cellular communication system, another type of radio communication system such as a near field communication system or wireless local area network (LAN) system, and in that case, the radio communication interface 912 may include the BB processor 913 and the RF circuit 914 for each radio communication system.

The respective antenna switches 915 switch connection destinations of the antennas 916 between a plurality of circuits (e.g., circuits for different radio communication systems) included in the radio communication interface 912.

Each of the antennas 916 includes a single or a plurality of antenna elements (e.g., a plurality of antenna elements constituting a MIMO antenna) and is used for transmission and reception of radio signals performed by the radio communication interface 912. As illustrated in FIG. 13, the smartphone 900 may include a plurality of antennas 916. Note that FIG. 13 illustrates an example of the smartphone 900 including the plurality of antennas 916; but the smartphone 900 may have a single antenna 916.

Furthermore, the smartphone 900 may include the antenna 916 for each of the radio communication systems. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies electric power to each block of the smartphone 900 illustrated in FIG. 13 via a power supply line partially represented by a broken line in the drawing. The auxiliary controller 919 causes the smartphone 900 to perform minimum necessary functions, for example, in a sleep mode.

Figure 9:
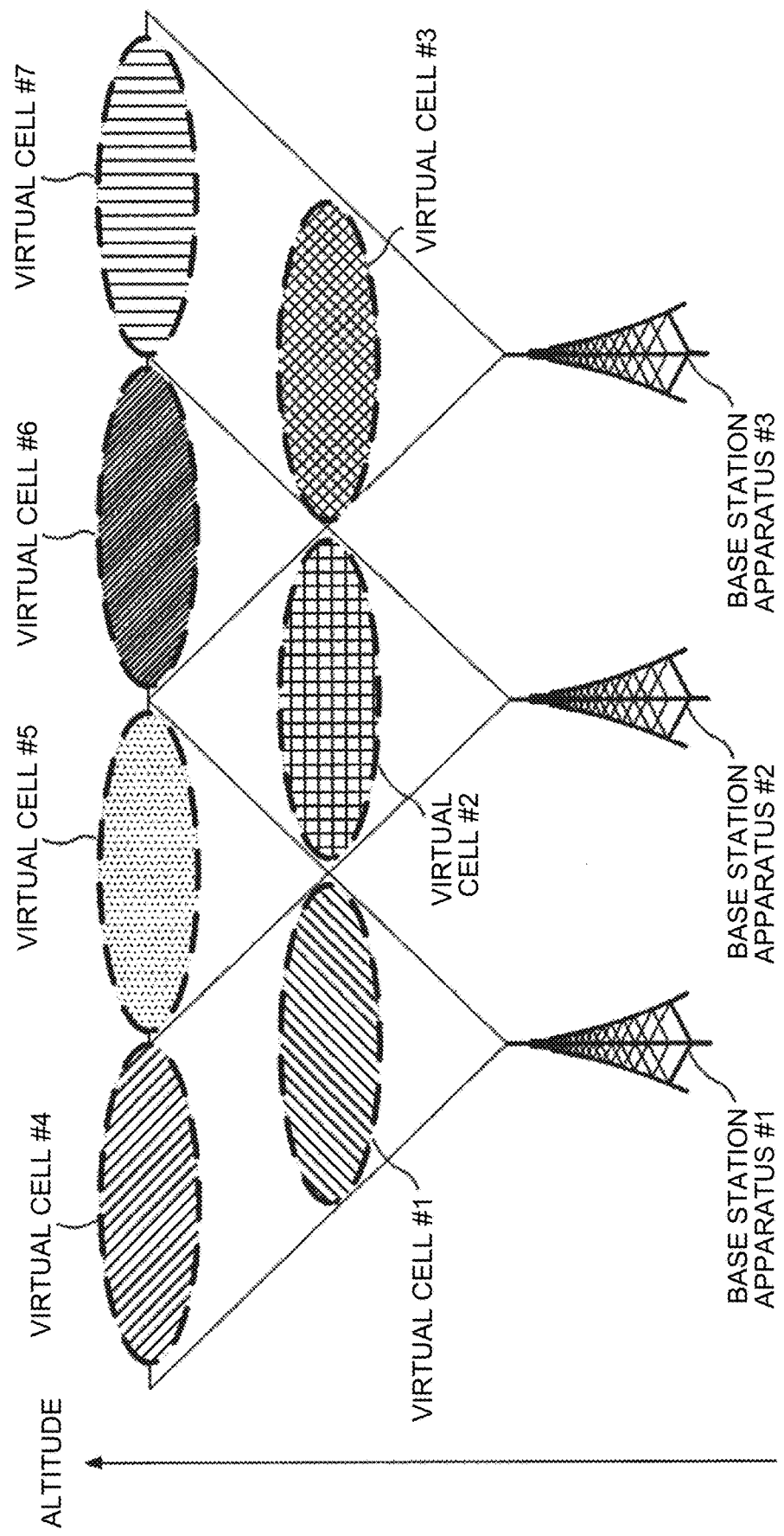
FIG. 9 is a diagram illustrating an example of virtual cell deployment.

In the smartphone 900 illustrated in FIG. 13, the upper layer processing unit 201, the control unit 203, the reception unit 205, and/or the transmission unit 207, which have been described with reference to FIG. 9, may be implemented in the radio communication interface 912 (e.g., the RF circuit 914 and/or BB processor 913), the processor 901, and/or the auxiliary controller 919. For example, the radio communication interface 912, the processor 901, and/or the auxiliary controller 919 is configured to receive first control information and second control information, and receive corresponding third control information in response to a control information request transmitted. For example, in the processors included in the radio communication interface 912, functions for performing these operations may be implemented. As a device that performs such operations, the smartphone 900 or the above-described module may be provided, or a program for causing a processor to perform the operations described above may be provided. Furthermore, a readable recording medium on which the program is recorded may be provided. Furthermore, the transmission/reception antenna 209 may be implemented in each antenna 916.

Second Application Example

Figure 14:
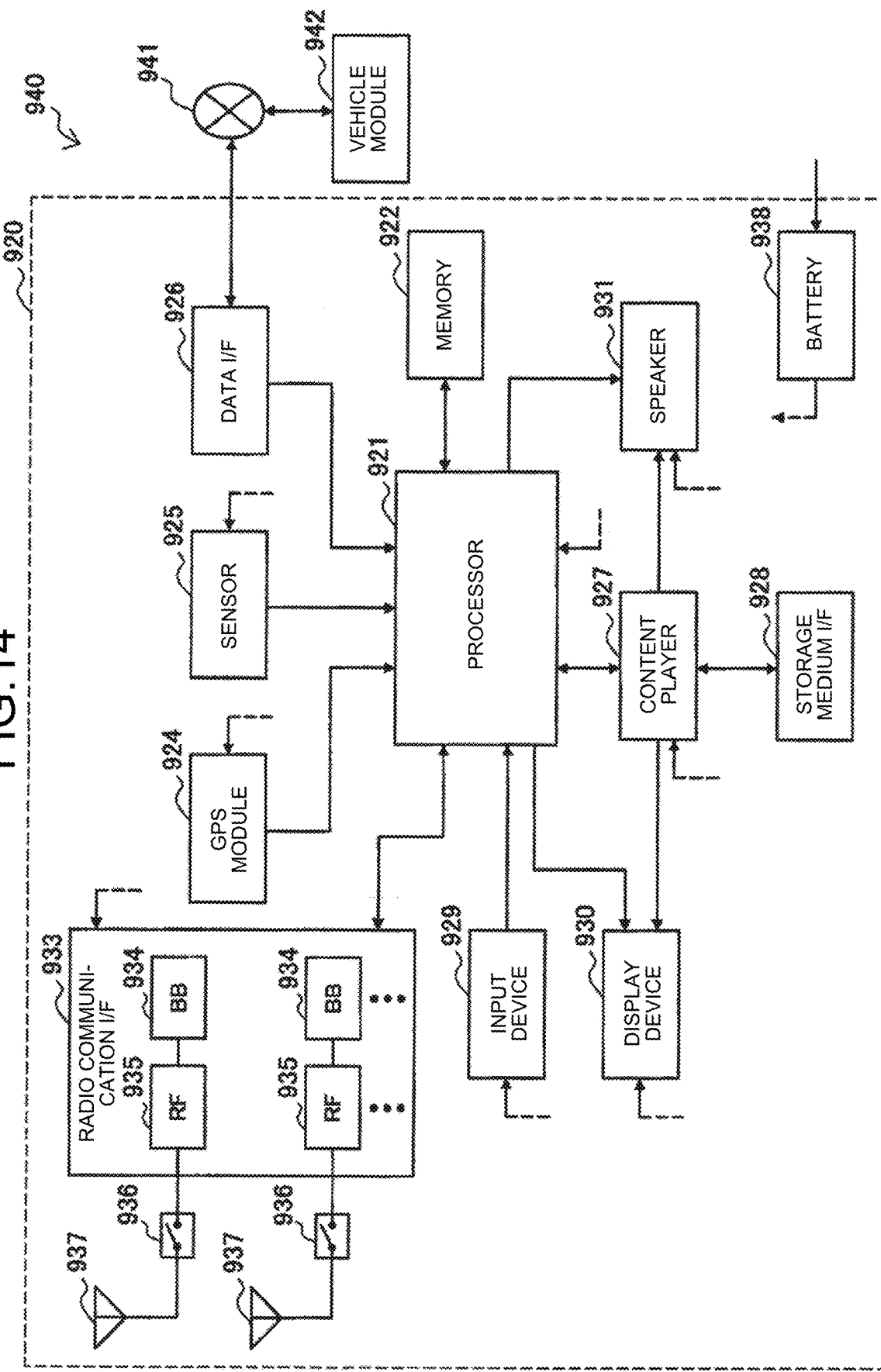
FIG. 14 is a block diagram illustrating an example of a schematic configuration of a car navigation device to which a technology according to the present disclosure is applicable.

FIG. 14 is a block diagram illustrating an example of a schematic configuration of a car navigation device 920 to which a technology according to the present disclosure is applicable. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or SoC and controls a navigation function and other functions of the car navigation device 920. The memory 922 includes RAM and ROM and stores programs and data executed by the processor 921.

The GPS module 924 measures the position (e.g., latitude, longitude, and altitude) of the car navigation device 920 by using a GPS signal received from a GPS satellite. The sensor 925 can include a sensor group such as a gyro-sensor, geomagnetic sensor, or atmospheric pressure sensor. The data interface 926 is connected to, for example, an in-vehicle network 941 via a terminal, not illustrated, and acquires data generated on the vehicle, such as vehicle speed data.

The content player 927 plays content stored on a storage medium (e.g., CD or DVD) inserted into the storage medium interface 928. The input device 929 includes, for example, a touch sensor that detects a touch on a screen of the display device 930, a button, a switch, or the like and receives an operation or information input from the user. The display device 930 includes a screen such as an LCD or OLED display and displays a navigation function or an image of content played. The speaker 931 outputs a navigation function or the sound of content played.

The radio communication interface 933 supports any of cellular communication systems such as LTE and LTE-Advanced and performs radio communication. The radio communication interface 933 is typically configured to include a BB processor 934, an RF circuit 935, and the like. The BB processor 934 may perform, for example, coding/decoding, modulation/demodulation, multiplexing/demultiplexing, or the like to perform various signal processing for radio communication. Meanwhile, the RF circuit 935 may include a mixer, a filter, an amplifier, and the like and transmits and receives radio signals via the antenna 937. The radio communication interface 933 may employ a one-chip module in which the BB processor 934 and the RF circuit 935 are integrated. As illustrated in FIG. 14, the radio communication interface 933 may include a plurality of BB processors 934 and a plurality of RF circuits 935. Note that FIG. 14 illustrates an example of the radio communication interface 933 including the plurality of BB processors 934 and a plurality of RF circuits 935, but the radio communication interface 933 may include a single BB processor 934 or a single RF circuit 935.

Furthermore, the radio communication interface 933 may support, in addition to a cellular communication system, another type of radio communication system such as a near field communication system or wireless LAN system, and in that case, the radio communication interface 933 may include the BB processor 934 and the RF circuit 935 for each radio communication system.

The respective antenna switches 936 switch connection destinations of the antennas 937 between a plurality of circuits (e.g., circuits for different radio communication systems) included in the radio communication interface 933.

Each of the antennas 937 includes a single or a plurality of antenna elements (e.g., a plurality of antenna elements constituting a MIMO antenna) and is used for transmission and reception of radio signals performed by the radio communication interface 933. As illustrated in FIG. 14, the car navigation device 920 may include a plurality of antennas 937. Note that FIG. 14 illustrates an example of the car navigation device 920 including the plurality of antennas 937, but the car navigation device 920 may have a single antenna 937.

Furthermore, the car navigation device 920 may include the antenna 937 for each of the radio communication systems. In that case, the antenna switch 936 may be omitted from the configuration of the car navigation device 920.

The battery 938 supplies power to each block of the car navigation device 920 illustrated in FIG. 14 via a power supply line partially represented by a broken line in the drawing. Furthermore, the battery 938 stores power that is supplied from the vehicle.

In the car navigation device 920 illustrated in FIG. 14, the upper layer processing unit 201, the control unit 203, the reception unit 205, and/or the transmission unit 207, which have been described with reference to FIG. 9, may be implemented in the radio communication interface 933 (e.g., RF circuit 935 and/or BB processor 934) and/or the processor 921. For example, the radio communication interface 933 and/or the processor 921 is configured to receive first control information and second control information, and transmit corresponding third control information in response to a control information request transmitted. For example, in the processors included in the radio communication interface 933, functions for performing these operations may be implemented. As a device that performs such operations, the car navigation device 920 or the above-described module may be provided, or a program for causing a processor to perform the operations described above may be provided. Furthermore, a readable recording medium on which the program is recorded may be provided. In addition, the transmission/reception antenna 209 may be implemented in each antenna 937.

Furthermore, the technology according to the present disclosure may be achieved as an in-vehicle system (or vehicle) 940 that includes one or more blocks of the above-described car navigation device 920, and further the in-vehicle network 941 and a vehicle module 942. The vehicle module 942 generates vehicle data such as a vehicle speed, an engine speed, or failure information and outputs the generated data to the in-vehicle network 941.

Note that the eNB described above may be gNB (gNodeB, next Generation NodeB).

6. Conclusion

As described above, according to the present disclosure, it is possible to improve transmission efficiency in a radio communication system in which a base station apparatus and a communication device communicate with each other.

The respective steps in the processing performed by each device described herein are not necessarily processed in chronological order in accordance with the order indicated in the sequence diagram or the flowchart. For example, the respective steps in the processing performed by each device may be processed in a sequence different from that indicated in the flowchart or processed in parallel.

Furthermore, it is also possible to create a computer program for causing hardware such as CPU, ROM, and RAM incorporated in each device to perform functions equivalent to those of the configurations of the devices described above. In addition, it is possible to provide a storage medium having such computer program stored therein. In addition, each functional block illustrated in the functional block diagram can be configured as hardware, and a series of processing steps can be achieved by such hardware.

The preferred embodiments of the present disclosure have been described above in detail with reference to the accompanying drawings, but the technical scope of the present disclosure is not limited to such examples. A person skilled in the art may obviously find various alternations and modifications within the technical ideas as set forth in the scope of the appended claims, and it should be understood that they will naturally come under the technical scope of the present invention.

In addition, the effects described herein are merely illustrative and demonstrative and are not limitative. In other words, the technology according to the present disclosure can exhibit, together with or instead of the effects, other effects apparent to those skilled in the art from the description herein.

Additionally, the technical scope of the present disclosure may include the following structure.

(1)

A communication device comprising:

a reception unit that receives system information including a set of identities indicating virtual cells; and a setting unit that selects a virtual cell identity to be applied, from the set.

(2)

The communication device according to claim (1), wherein the setting unit selects the virtual cell identity on a basis of positional information of the communication device, the positional information including an altitude.

(3)

The communication device according to claim (1), wherein the setting unit selects the virtual cell identity on a basis of RSRP measured from CRS.

(4)

The communication device according to claim (1), wherein the setting unit selects the virtual cell identity on a basis of a moving speed of the communication device.

(5)

The communication device according to any one of claims (1) to (4), wherein the virtual cell identity is associated with setting of CSI-RS, the CSI-RS being used for RRM measurement.

(6)

The communication device according to any one of claims (1) to (6), wherein the virtual cell identity is used to scramble a physical channel.

(7)

The communication device according to any one of claims (1) to (5), wherein the virtual cell identity is used to generate a sequence of a reference signal.

(8)

The communication device according to any one of claims (1) to (5), wherein the virtual cell identity is used to set RACH.

(9)

The communication device according to any one of claims (1) to (8), wherein the communication device is a communication device floating in air.

(10)

A base station apparatus comprising:
a setting unit that sets a plurality of identities indicating virtual cells; and
a transmission unit that transmits system information including a set of the virtual cell identities.

(11)

A method performed by a processor, comprising:
receiving system information including a set of identities indicating virtual cells; and
selecting a virtual cell identity to be applied, from the set.

(12)

A computer program for causing a computer to perform:
receiving system information including a set of identities indicating virtual cells; and
selecting a virtual cell identity to be applied, from the set.

REFERENCE SIGNS LIST

100 BASE STATION APPARATUS
101 UPPER LAYER PROCESSING UNIT
103 CONTROL UNIT
105 RECEPTION UNIT
1051 DECODING UNIT
1053 DEMODULATION UNIT
1055 DEMULTIPLEXING UNIT
1057 RADIO RECEIVING UNIT
1059 CHANNEL-MEASURING UNIT
107 TRANSMISSION UNIT
1071 CODING UNIT
1073 MODULATING UNIT
1075 MULTIPLEXING UNIT
1077 RADIO TRANSMISSION UNIT
1079 DOWNLINK REFERENCE SIGNAL GENERATING UNIT
109 TRANSMISSION/RECEPTION ANTENNA
110 SETTING UNIT
120 SELECTION UNIT
130 MESSAGE TRANSMISSION/RECEPTION UNIT
200 TERMINAL DEVICE
201 UPPER LAYER PROCESSING UNIT
203 CONTROL UNIT
205 RECEPTION UNIT
2051 DECODING UNIT
2053 DEMODULATION UNIT
2055 DEMULTIPLEXING UNIT
2057 RADIO RECEIVING UNIT
2059 CHANNEL-MEASURING UNIT
207 TRANSMISSION UNIT
2071 CODING UNIT
2073 MODULATING UNIT
2075 MULTIPLEXING UNIT
2077 RADIO TRANSMISSION UNIT
2079 UPLINK REFERENCE SIGNAL GENERATING UNIT
209 TRANSMISSION/RECEPTION ANTENNA
210 SELECTION UNIT
220 MESSAGE TRANSMISSION/RECEPTION UNIT

The invention claimed is:

1. A communication device having positional information including an altitude and comprising a processor configured to cause the communication device to:
receive system information including a set of identities indicating virtual cells associated with one or more base stations; and
select, based on the positional information including the altitude of the communication device, a virtual cell identity from the set through which to communicate with a first base station, from among the one or more base stations, associated with the selected virtual cell identity.

2. The communication device according to claim 1, wherein the processor is further configured to select the virtual cell identity on a basis of reference signal received power (RSRP) measured from cell-specific reference signal (CRS).

3. The communication device according to claim 1, wherein the processor is further configured to select the virtual cell identity on a basis of a moving speed of the communication device.

4. The communication device according to claim 1, wherein the virtual cell identity is associated with setting of channel state information reference signal (CSI-RS), the CSI-RS being used for radio resource management (RRM) measurement.

5. The communication device according to claim 1, wherein the virtual cell identity is used to scramble a physical channel.

6. The communication device according to claim 1, wherein the virtual cell identity is used to generate a sequence of a reference signal.

7. The communication device according to claim 1, wherein the virtual cell identity is used to set random access procedure (RACH).

8. The communication device according to claim 1, wherein the communication device is a communication device floating in air.

9. The communication device according to claim 1, wherein the processor is further configured to: receive system information including a set of identities indicating physical cells associated with one or more base stations; and
select, based on a comparison of information of the communication device to a threshold, a physical cell identity from the set.

10. The communication device according to claim 9, wherein the information of the communication device is a speed of the communication device, and wherein the processor is further configured to select a physical cell identity from the set when the speed of the communication device is below the threshold and to select a virtual cell identity from the set when the speed of the communication device is above the threshold.

11. The communication device according to claim 9, wherein the processor is further configured to select a physical cell identity from the set when the altitude of the communication device is below the threshold and to select a virtual cell identity from the set when the altitude of the communication device is above the threshold.

12. A base station apparatus comprising a processor configured to cause the base station apparatus to:
set a plurality of identities indicating virtual cells, wherein the setting includes setting virtual cell identities according to positional information of communication devices, the positional information including an altitude such that a first virtual cell identity at a first altitude is different from a second virtual cell identity at a second altitude different from the first altitude; and
transmit system information including a set of the virtual cell identities to one or more communication devices.

13. A method performed by a processor, comprising:
receiving system information including a set of identities indicating virtual cells associated with one or more base stations; and selecting, based on positional information including an altitude of a communication device, a virtual cell identity from the set through which to communicate with a first base station, from among the one or more base stations, associated with the selected virtual cell identity.

14. A non-transitory, computer-readable medium storing instructions that, when executed by a processor in the computer, control the computer to implement a method comprising:

receiving system information including a set of identities indicating virtual cells associated with one or more base stations; and selecting, based on positional information including an altitude of a communication device, a virtual cell identity from the set through which to communicate with a first base station, from among the one or more base stations, associated with the selected virtual cell identity.

* * * * *